US010725745B2

(12) United States Patent
Yao et al.

(10) Patent No.: US 10,725,745 B2
(45) Date of Patent: Jul. 28, 2020

(54) SYSTEMS AND METHODS FOR POLYGLOT ANALYSIS

(71) Applicant: Walmart Apollo, LLC, Bentonville, AR (US)

(72) Inventors: Yitao Yao, Saratoga, CA (US); James Tang, Cupertino, CA (US); Vivek Crasta, Sunnyvale, CA (US); Pei Wang, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 57 days.

(21) Appl. No.: 15/988,979

(22) Filed: May 24, 2018

(65) Prior Publication Data
US 2019/0361681 A1 Nov. 28, 2019

(51) Int. Cl.
*G06F 9/44* (2018.01)
*G06F 9/45* (2006.01)
*G06F 9/455* (2018.01)
*G06F 8/30* (2018.01)
*G06F 9/54* (2006.01)

(52) U.S. Cl.
CPC .............. *G06F 8/315* (2013.01); *G06F 9/547* (2013.01)

(58) Field of Classification Search
CPC .................................. G06F 8/315; G06F 9/547
See application file for complete search history.

(56) References Cited

U.S. PATENT DOCUMENTS

| 7,734,515 | B1* | 6/2010 | Frederick | G06F 9/465 |
| | | | | 705/26.1 |
| 8,561,038 | B1* | 10/2013 | Sams | G06F 8/30 |
| | | | | 717/107 |
| 9,159,024 | B2 | 10/2015 | Bhanot et al. | |
| 10,229,148 | B1* | 3/2019 | Nguyen | H04L 12/1822 |
| 2004/0040011 | A1* | 2/2004 | Bosworth | G06F 8/31 |
| | | | | 717/114 |
| 2011/0208617 | A1 | 8/2011 | Weiland | |
| 2012/0089963 | A1* | 4/2012 | Claussen | G06F 11/3604 |
| | | | | 717/123 |

(Continued)

OTHER PUBLICATIONS

Jaroslav Keznikl, Extensible Polyglot Programming Support in Existing Component Frameworks, 2011, pp. 108-115. https://ieeexplore.ieee.org/stamp/stamp.jsp?tp=&arnumber=6068329 (Year: 2011).*

(Continued)

*Primary Examiner* — Mongbao Nguyen
(74) *Attorney, Agent, or Firm* — Duane Morris LLP; Manita Rawat

(57) ABSTRACT

Systems, methods, and devices for polyglot computing may include, in a single execution, adapting at least one first instruction in a first language and at least one second instruction in the first language into a code comprising the at least one first instruction in the first language and the at least one second instruction in a second language; producing a first result in the first language based on executing the code using a dataset in a data store, wherein the producing the first result in the first language is performed in the single execution; producing a second result in the second language based on executing the code using the dataset; and adapting the second result in the second language into the second result in the first language.

20 Claims, 16 Drawing Sheets

(56) References Cited

U.S. PATENT DOCUMENTS

| | | | | |
|---|---|---|---|---|
| 2013/0055292 A1* | 2/2013 | Pierson | ............... | G06F 9/542 |
| | | | | 719/328 |
| 2013/0125095 A1* | 5/2013 | Claussen | ............ | G06F 11/3604 |
| | | | | 717/126 |
| 2013/0262524 A1* | 10/2013 | Mukhin | ............... | G06F 16/252 |
| | | | | 707/803 |
| 2014/0165032 A1* | 6/2014 | Balasubramanian | ..... | G06F 8/70 |
| | | | | 717/120 |
| 2014/0189663 A1* | 7/2014 | Guenthner | ............ | G06F 8/456 |
| | | | | 717/146 |
| 2014/0189664 A1* | 7/2014 | Guenthner | ............ | G06F 8/456 |
| | | | | 717/146 |
| 2015/0160934 A1* | 6/2015 | Beit-Aharon | ............ | G06F 8/76 |
| | | | | 717/137 |
| 2015/0227362 A1* | 8/2015 | Dvinsky | ............... | G06F 8/70 |
| | | | | 717/120 |
| 2015/0277864 A1* | 10/2015 | Muramatsu | ............ | G06F 8/41 |
| | | | | 717/140 |
| 2015/0331727 A1* | 11/2015 | Mameri | ............... | G06F 9/4484 |
| | | | | 719/315 |
| 2015/0347101 A1* | 12/2015 | Boehm | ............... | G06F 8/41 |
| | | | | 717/140 |
| 2016/0012350 A1* | 1/2016 | Narayanan | ........... | G06F 9/4552 |
| | | | | 706/12 |
| 2017/0046137 A1* | 2/2017 | Grimmer | ............... | G06F 8/51 |
| 2017/0315791 A1* | 11/2017 | Mascaro | ............... | G06F 8/60 |
| 2018/0013579 A1* | 1/2018 | Fairweather | ............ | G06F 8/34 |
| 2018/0165124 A1* | 6/2018 | Sinha | ............... | G06F 9/4881 |
| 2018/0329761 A1* | 11/2018 | Gokavarapu | ........... | G06F 9/542 |
| 2019/0079813 A1* | 3/2019 | O'Connor | ............ | G06F 9/4484 |
| 2019/0197418 A1* | 6/2019 | Abutbul | ............... | G06N 5/045 |
| 2019/0197419 A1* | 6/2019 | Abutbul | ............... | G06N 5/045 |

OTHER PUBLICATIONS

Juhana Harmanen, Polyglot Programming in Web Development, 2013, pp. 1-96. https://pdfs.semanticscholar.org/a8ca/59e34a5804ed8233263d84f724f9c4b95aa7.pdf (Year: 2013).*

Qin Ma, Combining Models with Code: a Tale of Two Languages, 2014, lines 1-6. https://ieeexplore.ieee.org/stamp/stamp.jsp?arnumber=6912082 (Year: 2014).*

Philip Mayer, Cross-Language Code Analysis and Refactoring, 2012, pp. 94-103. https://ieeexplore.ieee.org/stamp/stamp.jsp?tp=&arnumber=6392106 (Year: 2012).*

Laxmikant V, Kale, Programming Languages for CSE: The state of the art, 2004, pp. 18-26. https://ieeexplore.ieee.org/stamp/stamp.jsp?tp=&arnumber=683736&isnumber=15038 (Year: 2004).*

Robert M. Nowak, Polyglot Programming in Applications Used for Genetic Data Analysis, 2014, pp. 1-6. http://downloads.hindawi.com/journals/bmri/2014/253013.pdf (Year: 2014).*

* cited by examiner

SYSTEMS AND METHODS FOR POLYGLOT ANALYSIS

TECHNICAL FIELD

The disclosure relates generally to polyglot computing environments and, more particularly, to systems and methods for polyglot based real-time and big data processing, analytics, and machine learning.

BACKGROUND

At least some known businesses typically collect large amounts of data and use business intelligence and analytics to make sense of the data. As the volume of data being generated and analyzed has increased, so has the need for analyzing this data in real-time. This increasingly data rich environment offers tremendous potential for improving business results by making increasingly data driven decisions. This same growth in data volume, and the growing need to make more decisions more rapidly, is pushing businesses to look at new approaches and technology. Many businesses are adopting techniques, such as predictive analytics, to extract more meaning from their data. These techniques process large amounts of historical data to make predictions about the future. They allow businesses to make probabilistic predictions, such as how likely is this transaction to be fraudulent, how loyal is this customer, what offer will be most effective at increasing basket size for these customers and more. These predictions and probabilities can be used to improve decision-making throughout the organization.

Predictive analytics provides an enhanced view of customers and makes predictions about their current and future transaction behavior. This technique can be applied to a myriad of challenges, including customer segmentation, merchandising optimization, information security, marketplace trust and safety, and buyer fraud. However, within many businesses, the promise of predictive analytics is inhibited by a misalignment between technical and data science resources.

Customers of a business entity may buy, sell, or otherwise interact with the business entity's online transaction system through a website or a mobile application. The resulting online transaction data may be stored in a production database and first extracted, transformed, and loaded (ETL) into a data warehouse. A data scientist may take the transformed data and use different statistical tools to build an analysis (e.g., an algorithm or analytical process) in the form of models and scores. Examples of the statistical tools that the data scientist may use include R™ SaS™, MATLAB™, and the like.

Once the data scientist builds an analysis (e.g., an analytical machine learning (ML) model), the analysis is released to an application developer that must also convert the analysis written with one of the statistical tools into a language used in the online transaction system. The resulting code is then released into the online transaction system. However, the involvement of both the data scientist and the application developer creates a life cycle issue as the data scientist and the application developer will coordinate to properly release the data scientist's analysis upon the online transaction system. Also, the data scientist and application developer may iterate to avoid a mismatch between the application developer's interpretation and the data scientist's intention for an analysis. Accordingly, conventional techniques to produce analyses may require large amounts of overhead, but still fail to produce satisfactory results. Therefore, conventional techniques to for analysis production (e.g., producing an ML model) are not entirely satisfactory.

SUMMARY

The exemplary embodiments disclosed herein are directed to solving the issues relating to one or more of the problems presented in the prior art, as well as providing additional features that will become readily apparent by reference to the following detailed description when taken in conjunction with the accompanied drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In various embodiments, a system is disclosed. The system includes at least one processor operatively coupled with a data store, wherein the processor is configured to adapt at least one first instruction in a first language and at least one second instruction in the first language into a code, such as a polyglot code. The code comprises the first instruction in the first language, and the second instruction in a second language, wherein the processor is configured to adapt the first instruction and the second instruction in a single execution. The processor is further configured to produce a first result in the first language based on executing the code using a dataset in the data store, wherein the processor is configured to produce the first result in the first language in the single execution; The processor is further configured to produce a second result in the second language based on executing the code using the dataset, wherein the processor is configured to produce the second result in the second language in the single execution. The processor is further configured to adapt the second result in the second language into the second result in the first language, wherein the processor is configured to adapt the second result in the single execution.

In various embodiments, a method is disclosed. The method includes adapting at least one first instruction in a first language and at least one second instruction in the first language into a code, such as a polyglot code comprising the first instruction in the first language and the second instruction in a second language, and wherein the adapting the first instruction and the second instruction is performed in a single execution. The method also includes producing a first result in the first language based on executing the code using a dataset in a data store, wherein the producing the first result in the first language is performed in the single execution. The method also includes producing a second result in the second language based on executing the code using the dataset, wherein the producing the second result in the second language is performed in the single execution. The method also includes adapting the second result in the second language into the second result in the first language, where adapting the second result is performed in the single execution.

In various embodiments, a non-transitory computer readable medium having instructions stored thereon which, when executed by a processor cause a device to perform operations, is provided. The instructions cause the device to perform operations including adapting at least one first instruction in a first language and at least one second instruction in the first language into a code, such as a polyglot code comprising the first instruction in the first language and the second instruction in a second language, wherein the adapting the first instruction and the second instruction is performed in a single execution. The instructions also cause the device to perform operations including producing a first result in the first language based on executing the code using a dataset in a data store, wherein the producing the first result in the first language is performed in the single execution. The instructions also cause the device to perform operations including producing a second result in the second language based on executing the code using the dataset, wherein the producing the second result in the second language is performed in the single execution. The instructions also cause the device to perform operations including adapting the second result in the second language into the second result in the first language, where adapting the second result is performed in the single execution.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention. These drawings are provided to facilitate the reader's understanding of the invention and should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Figure 1:
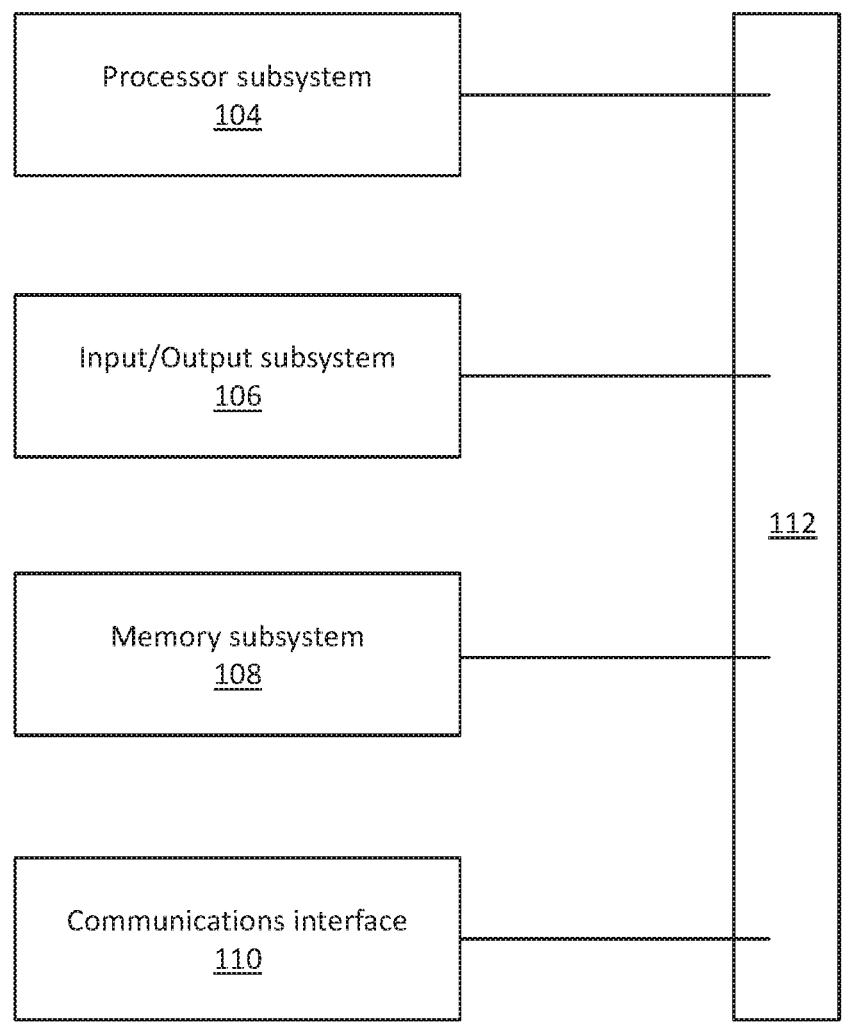
FIG. 1 illustrates a computer system configured to implement one or more processes, in accordance with some embodiments.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be rearranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Systems and methods in accordance with various embodiments include polyglot analysis systems that adapt various instructions (e.g., instructions that define functionalities and data structures) between different programming languages. Different programming languages may be referred to more simply also as languages for brevity. By adapting the different instructions among the different languages in various embodiments, the adapted instructions (e.g., instructed functions and/or data structures) may be processed natively within an execution environment within a single continuous execution (e.g., without need for separate processing or multiple executions for processing).

In certain embodiments, multiple instructions may be adapted into an underlying codebase (e.g., a polyglot code) from which the different instructions may be executed natively, all within one execution. For example, a first instruction (e.g., instructions that implement a functionality or define a data structure) in a first language and a second instruction in the first language may be adapted into a polyglot code that includes the first instruction in the first language and the second instruction in a second language. When the polyglot code is executed, the first and second instructions may produce a first result in the first language and a second result in the second language. The execution may be with respect to information stored within a data store accessible to a processor executing the first and second instructions so as to produce the first and second results. Additionally, the second result in the second language may be adapted into the first language. Each of the above steps may be performed within a single execution.

In various embodiments, the polyglot analysis system may utilize a script or scriptlets that enable data-scientists/analysts to encapsulate specific data processing logic using their familiar scripting languages (e.g., JavaScript, Python, R, and the like). These scriptlets are generally compacted code segments to perform specific set of operations, which can be easily reused and composed to perform more sophisticated tasks that normally (e.g., in traditional approaches) require skilled programming resources and lengthy software development cycles. Also, these scriptlets can leverage shared libraries/utilities under same or different programming languages exposed by the polyglot analysis system, and/or functions defined/exposed by other scriptlets under same or different programming languages.

Accordingly, the polyglot analysis system may provide a framework for easy composition, customization and scheduled-execution of sophisticated tasks. For example, the polyglot analysis system enables seamless referencing and execution across language boundaries naturally in single execution flow.

With the help of services, management, and toolsets provided by the polyglot analysis system, non-programmer data-scientists/analysts can easily author varieties of scriptlets to perform units of well-defined works, such as to: query and fetch datasets from variety of external data sources (e.g., runtime transactional systems, big data analytics systems, and the like); prepare, transform, and/or manipulate datasets; perform data analysis via machine learning models; store and/or output analysis results to multiple external destinations (e.g., production runtime systems, analytics systems, and the like); and to generate and/or notify business alerts to variety of parties and/or destinations.

The polyglot analysis system may provide various advantages over traditional computing systems. For example, traditional computing systems may support multiple language execution one at a time in an execution thread. Also, traditional computing systems may support library references between a limited number of languages. In contrast, a polyglot analysis system may feature natural object referencing and program execution spanning completely different languages, such as between JavaScript and Python, where the classes/objects and functions in one language can be referenced and invoked by other program instructions in a completely different language. There is no language translation in a polyglot analysis system for program instructions, no copying/reconstruction of mutable data objects from one language to another, and no artificial single direction gate from one language instruction to another language's instructions.

FIG. 1 illustrates a computer system configured to implement one or more processes, in accordance with some embodiments. The system 102 is a representative device and may comprise a processor subsystem 104, an input/output subsystem 106, a memory subsystem 108, a communications interface 110, and a system bus 112. In some embodiments, one or more than one of the system 102 components may be combined or omitted such as, for example, not including an input/output subsystem 106. In some embodiments, the system 102 may comprise other components not combined or comprised in those shown in FIG. 1. For example, the system 102 may also include, for example, a power subsystem. In other embodiments, the system 102 may include several instances of the components shown in FIG. 1. For example, the system 102 may include multiple memory subsystems 108. For the sake of conciseness and clarity, and not limitation, one of each of the components is shown in FIG. 1.

The processor subsystem 104 may include any processing circuitry operative to control the operations and performance of the system 102. In various aspects, the processor subsystem 104 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 104 also may be implemented by a controller, a microcontroller, an application specific integrated circuit (ASIC), a field programmable gate array (FPGA), a programmable logic device (PLD), and so forth.

In various aspects, the processor subsystem 104 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 102 may comprise a system bus 112 that couples various system components including the processing subsystem 104, the input/output subsystem 106, and the memory subsystem 108. It should be noted that, as used herein, the term "couple" is not limited to a direct mechanical, communicative, and/or an electrical connection between components, but may also include an indirect mechanical, communicative, and/or electrical connection between two or more components or a coupling that is operative through intermediate elements or spaces. The system bus 112 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 106 may include any suitable mechanism or component to enable a user to provide input to system 102 and the system 102 to provide output to the user. For example, the input/output subsystem 106 may include any suitable input mechanism, including but not limited to, a button, keypad, keyboard, click wheel, touch screen, motion sensor, microphone, camera, etc.

In some embodiments, the input/output subsystem 106 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 102. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 106. For example, the visual peripheral output device may be able to play media playback information, application screens for application implemented on the system 102, information regarding ongoing communications operations, information regarding incoming communications requests, or device operation screens, to name only a few.

In some embodiments, the communications interface 110 may include any suitable hardware, software, or combination of hardware and software that is capable of coupling the system 102 to one or more networks and/or additional devices. The communications interface 110 may be arranged to operate with any suitable technique for controlling information signals using a desired set of communications protocols, services or operating procedures. The communications interface 110 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 110 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 110 may comprise a wireless interface comprising one or more antennas, transmitters, receivers, transceivers, amplifiers, filters, control logic, and so forth.

In various aspects, the communications interface 110 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1xRTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 108.

In some embodiments, the memory subsystem 108 may comprise any machine-readable or computer-readable media capable of storing data, including both volatile/non-volatile memory and removable/non-removable memory. The memory subsystem 108 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 102.

In various aspects, the memory subsystem 108 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 108 may contain an instruction set, in the form of a file for executing various methods as described herein. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processing subsystem 104.

Figure 2:
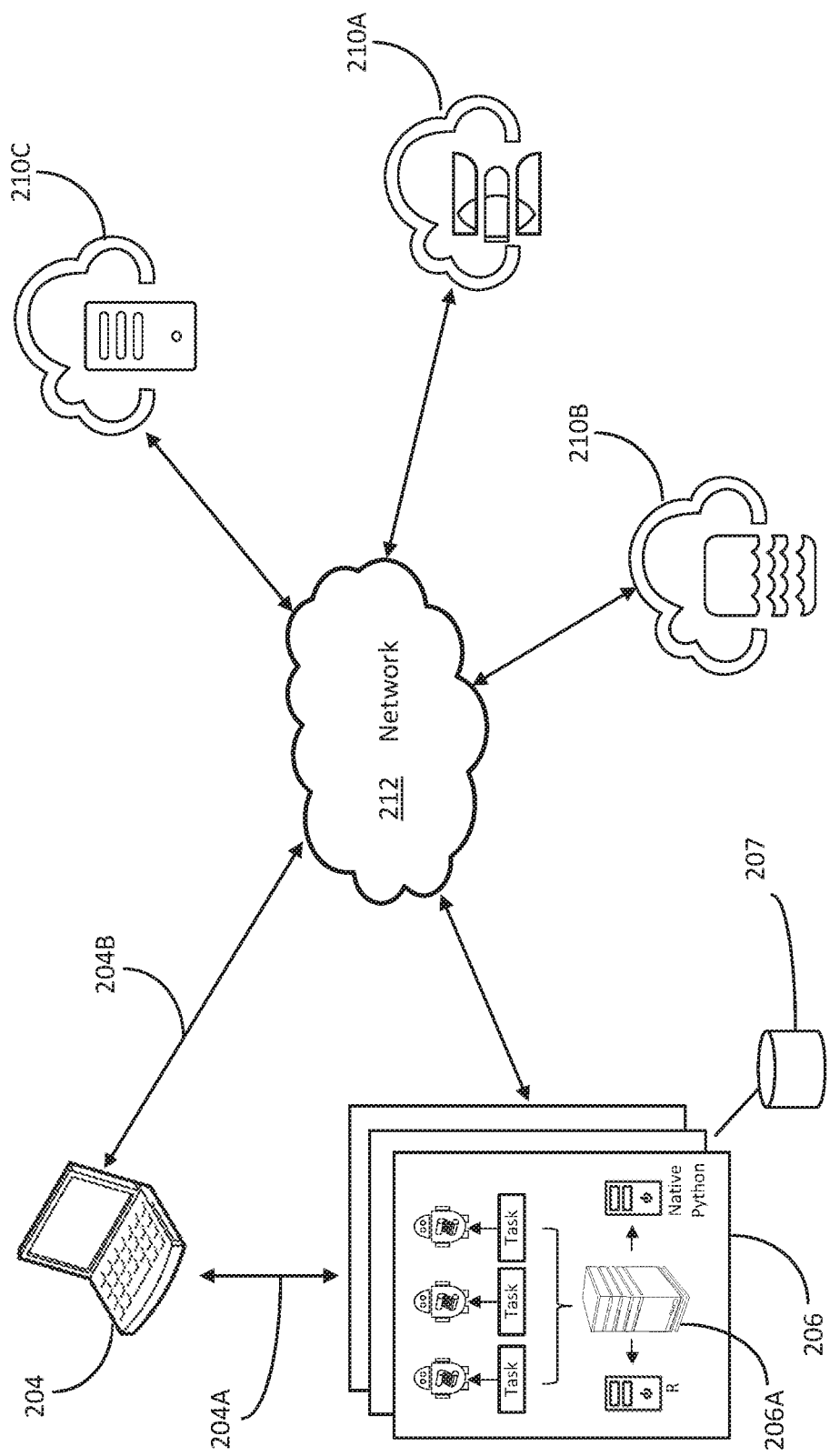
FIG. 2 illustrates a network diagram of a polyglot analysis system, in accordance with some embodiments.

FIG. 2 illustrates a network diagram of a polyglot analysis system 202, in accordance with some embodiments. The polyglot analysis system 202 may include various components, such as a user device 204 (e.g., a terminal or local computing device with web browser), a polyglot service 206 (which may also referred to as a bot service), and remote data services 210A, 210B, 210C (e.g., services that may be called by a polyglot service), connected over a network 212. The user device 204 may host a bot agent that provides management services and user interfaces in the user device's web browser. Each of the remote data services 210A, 210B, 210C may include at least one server (e.g., at least one remote server accessible over the network 212) with an optionally associated local data store at each respective server.

Each of the components of the polyglot analysis system 202 may be in signal communication, for example, through the network 212 (e.g., the Internet) or through direct connections. Also, each of the components may include a computing system as described above in conjunction with FIG. 1. Similar description is not repeated herein.

In certain embodiments, the user device 204 may, via a web browser, interact with a bot agent (e.g., web services and applications) that provides polyglot analysis system management and a user interface for a user to, for example, author scripts (e.g., bot scriptlets) and control test/execution of a polyglot service or bot engine (e.g., a polyglot bot engine). The bot agent may be an interface to the polyglot service 206, which may be local or remote. In embodiments where the bot agent at the user device 204 may utilize a polyglot service 206 that is local to the bot agent (e.g., a local polyglot service). The polyglot service 206 may perform polyglot processing as will be discussed further below. Accordingly, the bot agent at the user device 204 may communicate with the polyglot service 206 directly (e.g., as noted by direct connection 204A) and not via the network 212

In various embodiments, the bot agent at the user device 204 may be configured to communicate with a polyglot service 206 that is remote to the bot agent at the user device 204 (e.g., a remote polyglot service that may be interfaced with the bot agent at the user device 204 via a network connection 204B), such as by communicating over the network 212. In certain embodiments, multiple polyglot services 206 may be accessible to the bot agent at the user device 204 remotely while in further embodiments, only a single polyglot service 206 is accessible to the bot agent at the user device 204 remotely.

The polyglot service 206 may include one or more combinations of servers and local or shared data stores accessible to the polyglot service 206. Also, as will be discussed in further detail below, the polyglot service 206 may perform polyglot processing to adapt various instructions between different languages within a single execution. Specifically, polyglot processing may enable seamless adaptation of an instruction (e.g., instructions for a functionality with input and output data structure) within an original language to be natively executable in a native language (e.g., a natively executable language) that may be different than the original language. For example, the polyglot processing may preprocess the instruction in the original language that invokes instructions in another language so that it is adapted (e.g., reformatted) for execution in a respective native language. This ensures native execution of the instruction when the original language of the instruction is not in the native language. This adaptation may be performed in a single execution.

Also, polyglot processing may enable re-adaptation of executed instructions (e.g., results of executing the instructions) from the native language to the original language. This re-adaptation may be auto-performed by a polyglot service, without manual user intervention. Also, this re-adaptation may process results from the single execution in the native language so that the results are adapted (e.g., re-adapted, or reformatted) back into original language. This ensures native execution of the instruction when the original language of the instruction is not in the native language and re-adapting or reformatting of such results back into the original language. This re-adaptation may be performed in the same single execution as the adaptation. Also, the term adapting may be utilized to refer to wrapping code or data structures when crossing original and native language boundaries, and may encompass forward adaptation (e.g., from an original language to a native language) or reverse adaptation (e.g., from the native language to the original language, or re-adapting), applicable to both inputs (e.g., parameters) and outputs (e.g., results).

As an illustrative example, the polyglot service 206 may include, for example, a Java process 206A including associated tasks, polyglot bot engines, polyglot frameworks with JavaScript and Python interpreters, as well as R and native Python processes. A cluster of polyglot services 206 may share a common data store 207. Accordingly, the bot agent at the user device 204 may communicate with a polyglot service 206 for polyglot processing. Specifically, the bot agent at the user device 204 may communicate commands and instructions to the polyglot service 206 either remotely or locally and receive results and feedback for display on the user device's web browser. The bot agent at the user device 204 may send start/stop commands to the polyglot service 206. The polyglot service 206 may then fetch and execute the instructions and adapt the instructions into a native language when encountered. Once the instructions are in the native language, the instructions may be executed to produce results via communication with the remote data services 210A, 210B, 210C over the network 212. In certain embodiments, the adaptation may include adaption of the original language into a native language that may be communicated with the remote data services 210A, 210B, 210C for native execution at the remote data services 210A, 210B, 210C. In certain embodiments, results from execution using the instructions at the remote data services 210A, 210B, 210C may yet be further processed by the polyglot service 206 based on the instructions originally provided from the user via the bot agent at the user device 204. Then, the final results may be re-adapted from their respective native languages back into the original language provided by the user via the bot agent at the user device 204 and communicated to the user device 204. The process of polyglot processing by the polyglot service 206, including the processing from the original language to the native language and back again, may be performed in a single execution.

In various embodiments, there may be multiple polyglot services 206 available locally or remotely. Also, each polyglot service 206 may be capable of servicing multiple user devices 204 or multiple tasks executions of polyglot processing from one or more user devices. Furthermore, the remote data services 210A, 210B, 210C may include, for example, various conventional data services such as a data service search engine 210A, a data lake or big data system 210B, and/or a real time predicative intelligence platform 210C.

Figure 3:
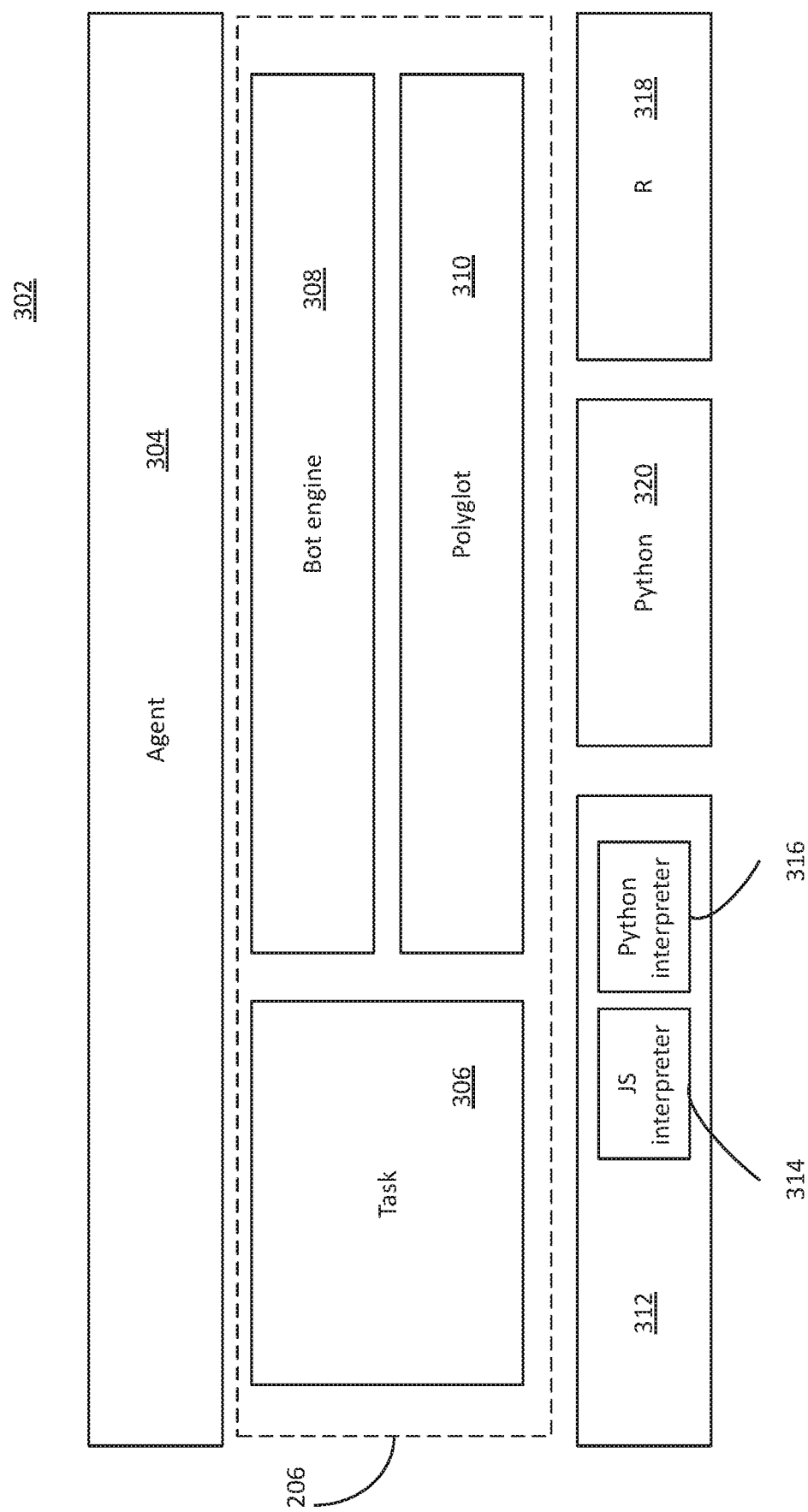
FIG. 3 illustrates a software stack for a polyglot analysis system, in accordance with some embodiments.

FIG. 3 illustrates a software stack 302 for a polyglot analysis system, in accordance with some embodiments. As noted above, the polyglot analysis system may include a polyglot service that may be accessible locally and/or remotely. The software stack 302 may represent a software stack of the polyglot analysis system. The software stack 302 may include a bot agent 304, which provides bot management services and a user interface. In certain embodiments, the bot agent 304 includes a thin client from where a user device may interface with the polyglot analysis system. At the bot agent 304, a user may provide instructions in an original language (e.g., an arbitrary input language) for polyglot processing. Accordingly, the bot agent may represent web services and applications to provide polyglot analysis system management and a user interface for a user to author scripts and control bot test/execution among others, as will be discussed in further detail below and in connection with FIG. 9.

Returning to FIG. 3, in certain embodiments, these instructions may effectuate tasks 306 which, if the original language is a native language, may be natively executed. Tasks 306 may refer to managed executions that can be scheduled statically or dynamically, started on-demand synchronously or asynchronously, and/or executed in series or parallel. Further discussion of aspects of tasks 306 are provided below and at least in connection with FIG. 8. Returning to FIG. 3, if the original language of instruction is not the native language of execution, the original language may be processed by a polyglot bot engine 308 so that the original language may be adapted with a polyglot framework 310 (e.g., adapted with a library) that may be executed natively. For example, native execution can be performed on a Java virtual machine 312 where Java is a native language, a JavaScript interpreter 314 where JavaScript is a native language, a Python interpreter 316 where Python is a native language, R Engine 318 where R is a native language, and a Python Engine 320 where Python is a native language.

The polyglot bot engine 308 may represent a script execution environment for both a polyglot bot driver and polyglot bot assignments, as will be discussed in further detail below and at least in connection with FIG. 10. Returning to FIG. 3, the polyglot framework 310 may represent a framework (e.g., a library) to enable seamless referencing and execution across language boundaries naturally in a single and continuous execution flow. Further discussion of aspects of a polyglot framework 310, such as the specifics of a polyglot codebase, is discussed further below and at least in connection with FIGS. 4, 5, and 6. A polyglot service 206 may reference a wrapper (e.g., combination) of a polyglot bot engine 308, tasks 306, and polyglot frameworks 310. The polyglot service 206 is discussed further below and at least in connection with FIG. 8.

Figure 4:
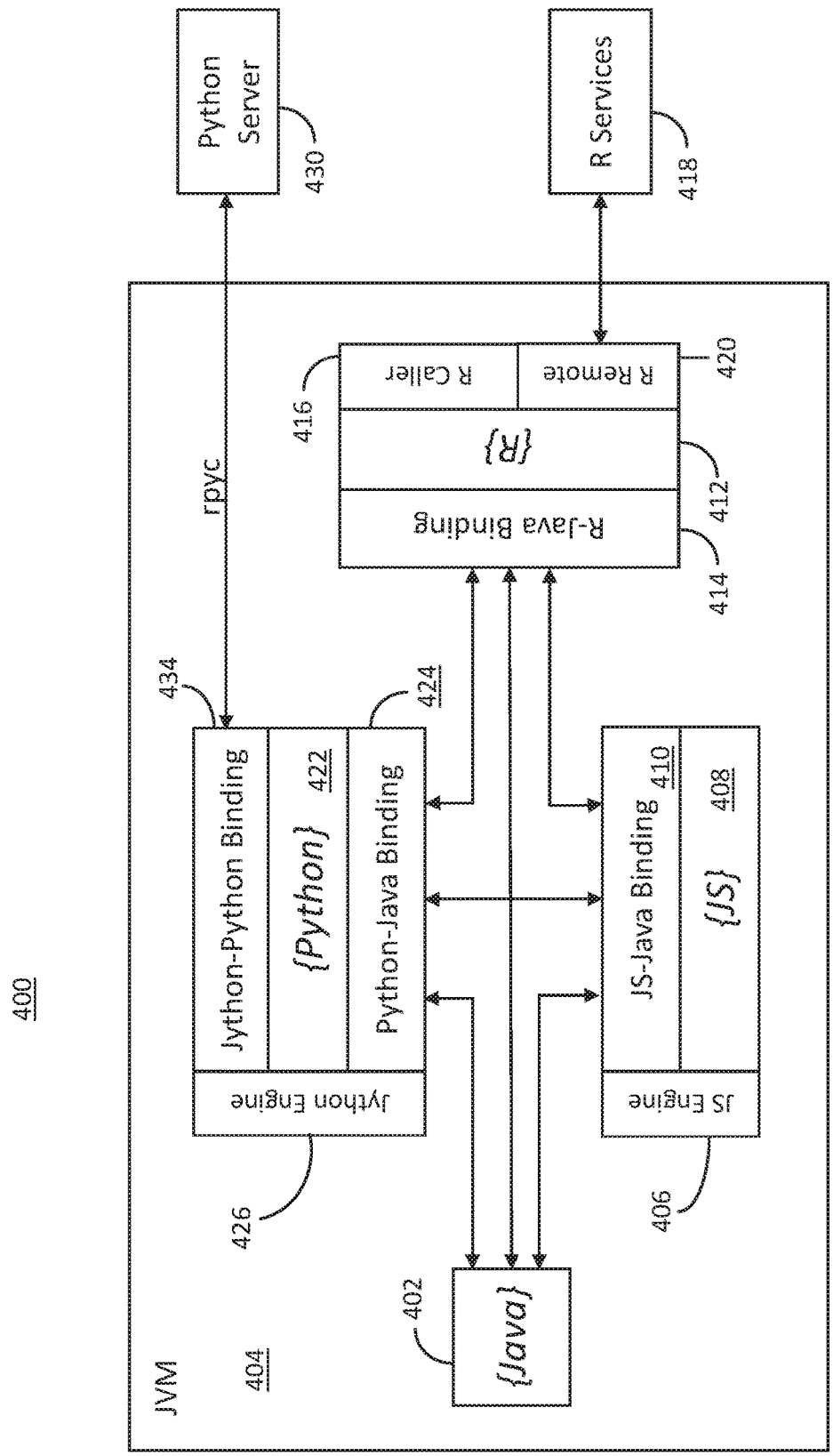
FIG. 4 is a block diagram that illustrates polyglot interoperability, in accordance with some embodiments.

FIG. 4 is a block diagram 400 that illustrates polyglot interoperability in a polyglot process, in accordance with some embodiments. Instructions may be initially written in an original language, such as Java 402. From the original language, Java 402, the polyglot process may adapt the instructions in the original language into a native language for which the instructions may be executed natively, arbitrarily chosen here as JavaScript (JS), R, or Python. For example, the instructions may be input in Java 402 within the context of the Java virtual machine 404. In certain embodiments, if the instructions are to be natively executed using a Java engine 406, the original Java instructions would be adapted from the original Java 402 language into the native JavaScript language 408 via a JS-Java binding 410. In various embodiments, scripts that may adapt the instructions between languages may be referred to as bindings. These bindings may both adapt the instruction (e.g., from a first language to a second language) and readapt the instructions (from the second language to a first language).

In further embodiments, if the instructions are to be natively executed in R 412, the original Java 402 instructions would be adapted from the original Java 402 language into the R 412 language via a R-Java binding 414. Once in R, the instructions may be executed using local or remote resources. For examples, the instructions may execute a local R caller 416 or may access remote R services 418 via a remote R caller 420. The remote data services may be accessible over a network.

In additional embodiments, if the instructions are to be natively executed in Python 422, the original Java instructions would be adapted from the original Java 402 language into the Python 422 language via a Python-Java binding 424. Different than the above examples, the instructions in the Python 422 language may not necessarily be natively executable in a Python engine, but may be natively executed in a Jython engine 426, for example. Once in the Python 422 language, the instructions may be executed using local or remote resources. For examples, the instructions may access remote Python services 430 via a remote python caller by being further adapted via a Jython-Python binding 434 (e.g., binding from execution in the Jython engine 426 so that the instructions may be natively executed by the remote Python services 430 (e.g., a remote python server). The remote data services may be accessible over a network.

In additional embodiments, among certain scripting languages (e.g., JavaScript, Python and R), the data structures and instructions in one language can be referenced and invoked by data structures and instructions in a different language via their Java language bindings. For example, via Python-Java binding 424 and JavaScript-Java binding 410, data structures and instructions defined and executed in Python 422 can be directly adapted and invoked by data structures and instructions defined and executed in JavaScript 408, and vice versa.

Figure 5:
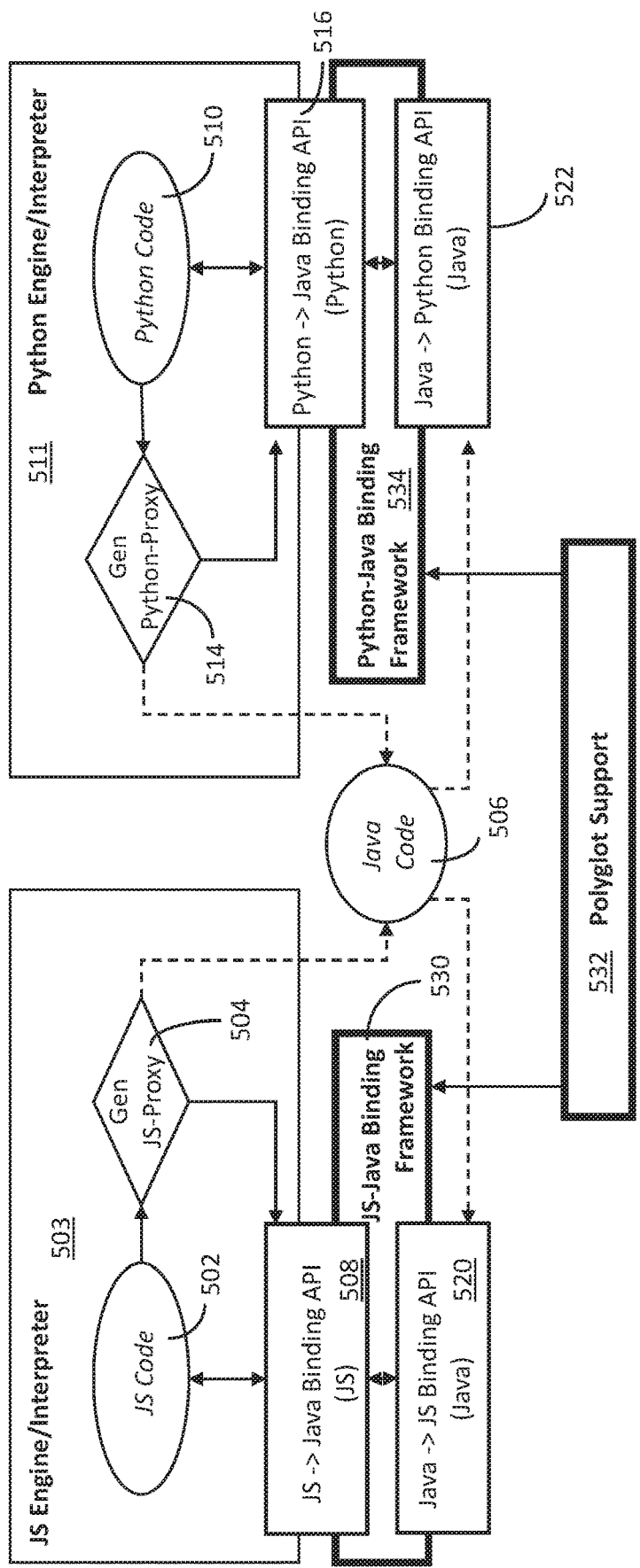
FIG. 5 is a block diagram that illustrates binding of a polyglot analysis system, in accordance with some embodiments.

FIG. 5 is a block diagram 500 that illustrates binding of a polyglot analysis system, in accordance with some embodiments. The binding may effectuate a polyglot process to adapt instructions from one language into another. For example, instructions may be in the JavaScript language (e.g., as JavaScript code 502) for execution as part of a JavaScript engine or interpreter 503. From the JavaScript code 502, the instructions may be processed by a JavaScript-proxy generator 504 into Java code 506. The JavaScript to Java binding API 508 and Java to JavaScript binding API 520 facilitate the dual direction adaptions between instructions in JavaScript (e.g., JavaScript code 502, JavaScript-proxy generator 504) and instructions in Java (e.g., Java code 506, polyglot support in the Java language 532).

Similarly, instructions may be in the Python language (e.g., as Python code 510) for execution as part of a Python engine or interpreter 511. From the Python code 510, the instructions may be processed by a Python-proxy generator 514 into Java code 506. The Python to Java binding API 516 and Java to Python binding API 522 facilitates the dual-direction interactions and adaptions between instructions in Python (e.g., Python code 510, Python-proxy generator 514) and instructions in Java (e.g., Java code 506, polyglot support in the Java language 532).

The JavaScript to Java binding API 508 is defined in the JavaScript language, and the Java to JavaScript binding API 520 is defined in the Java language. A JavaScript to Java binding framework 530 provides implementation to support these two APIs and their dual-direction interactions and adaptions.

Similarly, The Python to Java binding API 516 is defined in the Python language, and the Java to Python binding API 522 is defined in the Java language. A Python to Java binding framework 534 provides implementation to support these two API and their dual-directions interactions and adaptions.

The polyglot support in the Java language 532 enables dual direction interactions and adaptions between the JavaScript to Java binding framework 530 and the Python to Java binding framework 534. The polyglot support in the Java language 532 together with the JavaScript to Java binding framework 530 and the Python to Java binding framework 534 enables dual-directions interactions and adaptions between JavaScript instructions (e.g., JavaScript code 502) and Python instructions (e.g., Python code 510).

Figure 6:
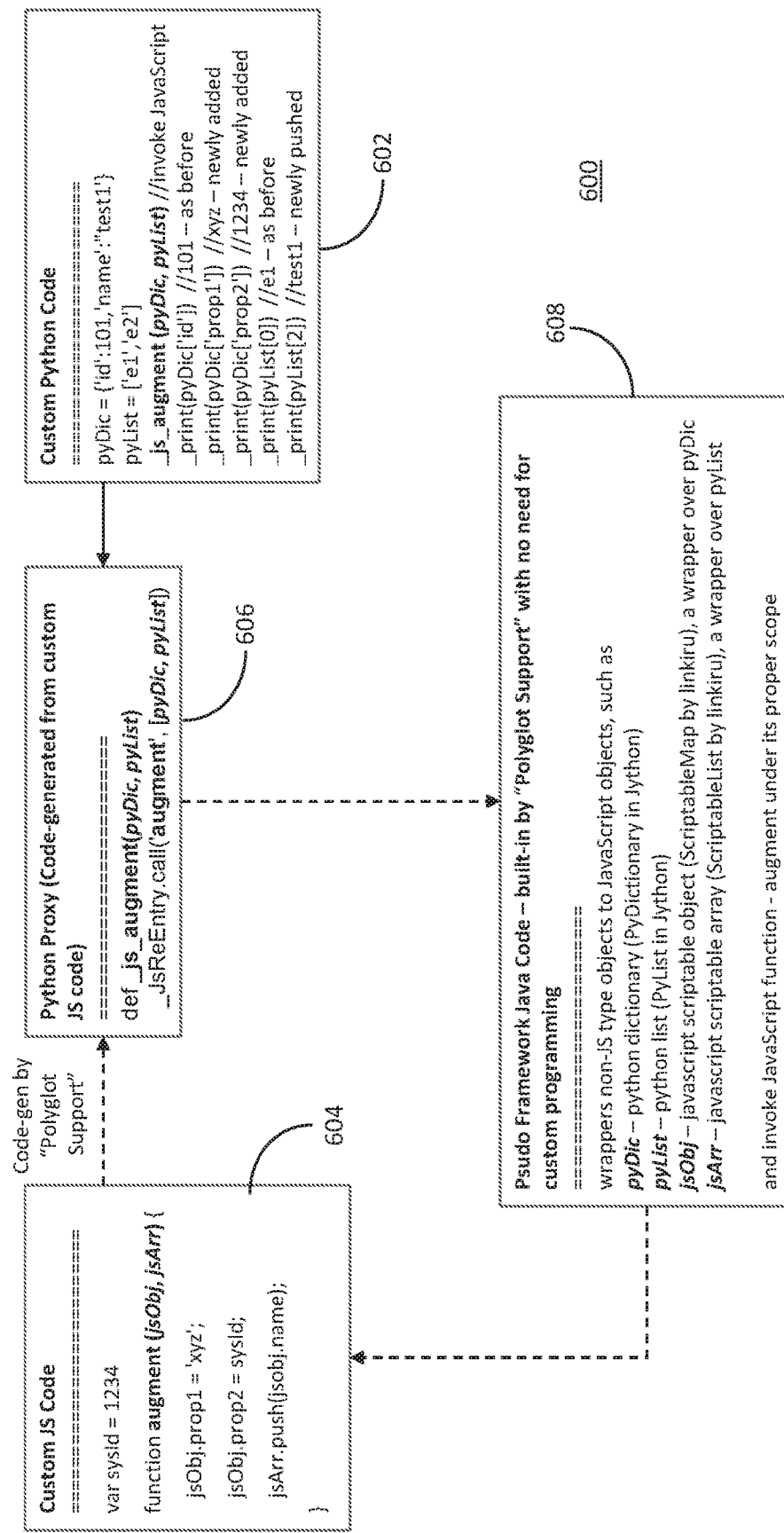
FIG. 6 a block diagram that illustrates a process of adapting from Python to JavaScript and back to Python, in accordance with some embodiments.

FIG. 6 a block diagram 600 that illustrates a process of adapting instructions between Python and JavaScript, in accordance with some embodiments. Stated another way, block diagram 600 illustrates a process of adapting from adapting instructions in Python code 602 to instructions in JavaScript code 604, for native execution in the JavaScript code 604.

The Python code 602, which is executed in a Python interpreter, may include instructions that invoke JavaScript (e.g., the native language) as a JavaScript function (e.g., "augment") and define objects (e.g., data) for processing. Accordingly, the instructions in the original language may indicate the native language for which the polyglot process may adapt code in the original language. The invocation of JavaScript as a JavaScript function (e.g., "augment) may execute a Python proxy 606. The Python proxy 606 may utilize Java code 608 to wrap non-JavaScript type objects from the Python code 602 into JavaScript objects to invoke the JavaScript function (e.g., noted as "augment" in blocks 602, 608, and 604). The Java code 608 may invoke the JavaScript code 604 in a JavaScript interpreter for which the data structures (e.g., pyDic, pyList) in the original Python code 602 are wrapped into the native JavaScript (e.g., jsObj, jsArr) for native execution. In certain embodiments, the Python proxy 606 may also be generated based on instructions from the JavaScript code 604 by utilities from a polyglot support (e.g., a polyglot support in the Java language, as discussed above).

Figure 7:
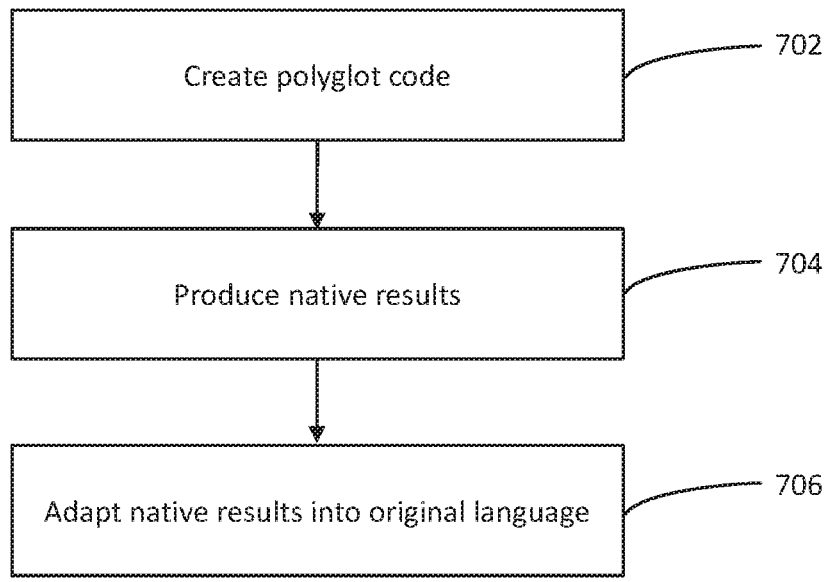
FIG. 7 is a schematic flow chart of a polyglot process, in accordance with some embodiments.

FIG. 7 is a flow chart of a polyglot process 700, in accordance with some embodiments. The process 700 may be performed at a remote or local polyglot service, as introduced above. It is noted that the process 700 is merely an example, and is not intended to limit the present disclosure. Accordingly, it is understood that additional operations may be provided before, during, and after the process 700 of FIG. 7, certain operations may be omitted, certain operations may be performed concurrently with other operations, and that some other operations may only be briefly described herein.

At operation 702, a polyglot code may be produced from original code in an execution. The polyglot code may be created by adapting instructions from an original language (e.g., code in the original language, or original code) into a native language (e.g., code in the native language, or native code). As discussed above, an original language may be a language of instruction or input into a polyglot service by a user. Also, a native language may be a language configured for native execution (e.g., execution within a virtual machine or a complier), with syntax compatible with the libraries that the instructions call. This adaptation may be performed in an automated fashion where different instructions, and/or different parts of a single instruction, may be adapted from the original language into different native languages. For example, the adaptation may be performed by a script (e.g., a scriptlet or function that is part of a polyglot analysis) that utilizes different adaptation libraries to adapt the instructions from an original language into a native language to make the instructions compatible with the libraries that the instructions intend to call. These adaptations may include adapting the instructions in the original language via wrappers or a wrapper function. The adaptation libraries may be in different languages or may be in a same consistent language. In certain embodiments, operation 702 may be performed in one execution.

In various embodiments, instructions may be implemented as scriptlets (e.g., author scriptlets, code, bot scriptlets, or scripts reflecting the instructions) that are authored in their respective languages (e.g., JavaScript or Python) chosen by their authors (e.g., users). These instructions may be executed in a native execution environment for the respective language that they are written in. To support invocation between different instructions of different languages, code-generated proxies may expose the function signatures from one language to other different languages using utilities from a polyglot support (e.g., a polyglot support in the Java language, as discussed above). Accordingly, the instructions may be adapted to functionally produce a polyglot code (e.g., an executable result of a polyglot framework) that is automatically configured for native execution irrespective of the original language of instruction. In particular embodiments, there may be no direct language translation of instructions but rather the instructions may be adapted for native execution, as discussed above, for example in connection with FIG. 6. Accordingly, the polyglot code (e.g., an executable result of a polyglot framework) wraps input data structures (e.g., instructions) from an original language to native language compatible data structures.

Returning to FIG. 7, at operation 704, the polyglot process 700 may produce native results in the same execution as operation 702. The native results may be results that are produced as a result of executing the polyglot code of operation 702 to produce results.

At operation 706, the native results may be adapted into the original language (e.g., the original code) in the same execution as operation 702. This adaptation may be performed in an automated fashion where different results from different instructions, or different parts of a single instruction, may be adapted from the different native languages into the original language. This may be an inverse process of operation 702. For example, the adaptation may be performed by a script that utilizes different adaptation libraries to re-adapt the results from the native language to the original language. These re-adaptations may include re-adapting the instructions back the original language via wrappers or a wrapper function (e.g., an un-wrapping function or an un-wrapper). For example, a wrapper may wrap instructions and an un-wrapper may unwrap instructions.

In particular embodiments, as noted above, the polyglot code (e.g., an executable result of a polyglot framework) wraps input data structures from an original language to native language compatible data structures. After executing instructions in a native environment for the wrapped data structures, the polyglot code (e.g., an executable result of a polyglot framework) may also wrap natively produced output data structures into a data structure of the original language. This invocation or calling pattern can occur in both directions within a single execution path (e.g., JavaScript to Python to JavaScript to Python to JavaScript and so on).

In certain embodiments, execution information may be wrapped and/or unwrapped by a wrapper or a wrapper function. The execution information may be information, such as a token or an identifier, for maintaining execution cohesion so that execution of instructions associated with the execution information is performed within an execution identified by the execution information. Accordingly, execution information may identify an execution associated with a particular instruction and/or result. Also, both forward and reverse adaptation may adapt execution information in performance of adaptation so that the adapted instructions, and corresponding results, are associated with a particular execution. In various embodiments, a polyglot process (e.g., including adapted instructions and corresponding results) may be associated with and performed in a single execution.

In particular embodiments, performance of a polyglot process in a single execution may advantageously free up computing resources. For example, by performing a polyglot process in a single execution in multithreaded environments, all instructions may be executed by a single thread (e.g., instead of across different threads). Thus, the other threads of the multithreaded environment may be utilized for purposes other than the polyglot process.

Figure 8:
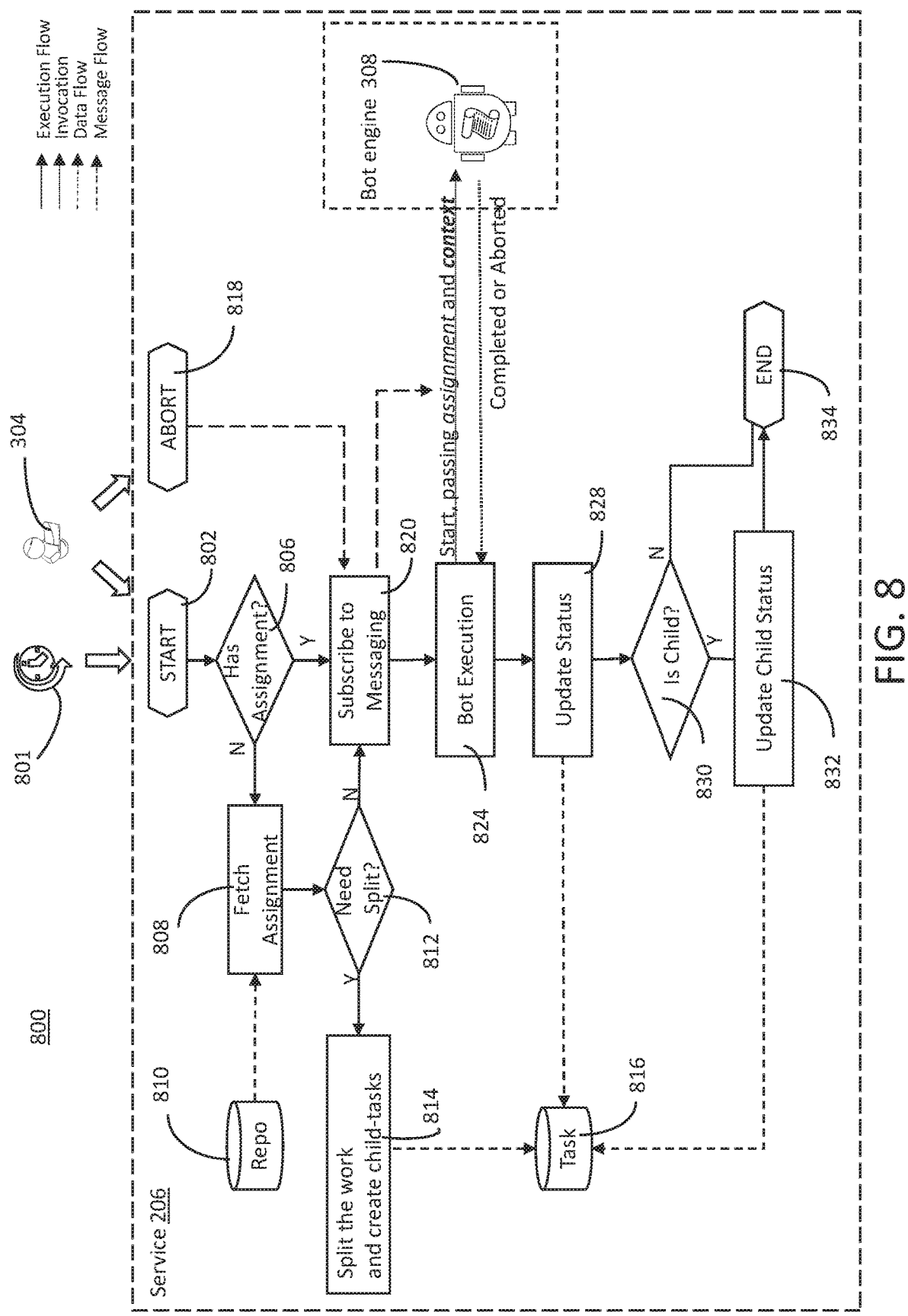
FIG. 8 is a schematic flow chart of a polyglot bot process, in accordance with some embodiments

In certain embodiments, certain instructions that define functions and/or operations may be more efficiently performed in a particular language different than a native language and/or an original language. Accordingly, the native and original languages may be adapted into one or more intermediary languages in an automated manner to execute certain instructions. For example, the adaptations may be nested where instructions in an original language are then adapted into an intermediary language for certain operations, which is then finally adapted into the native language. As another example, the re-adaptations may be nested where results in a native language are then adapted (or re-adapted) into an intermediary language for certain operations, which is then finally adapted (or re-adapted) into the original language FIG. 8 is a schematic flow chart of a polyglot bot process 800, in accordance with some embodiments. The polyglot bot process 800 may execute processes related to the polyglot service 206 (introduced above in connection with FIG. 3). The polyglot service 206 may access a polyglot bot engine 308 to execute an assigned polyglot code on demand, in local and/or connected remote processes/servers, to adapt between languages such as R and Python. The assigned polyglot code may include instructions to call remote data services via built-in function libraries or HTTP/HTTPs. In certain embodiments, the polyglot service 206 may be a specific implementation of a polyglot service. Returning to FIG. 8, a polyglot bot engine may be a software application that runs automated tasks (e.g., scripts) over a network that implement a polyglot process in an automated fashion. For example, a polyglot bot engine may be a software application that performs a polyglot process in an automated manner.

The process 800 may be performed utilizing the polyglot service 206. It is noted that the process 800 is merely an example, and is not intended to limit the present disclosure. Accordingly, it is understood that additional operations may be provided before, during, and after the process 800 of FIG. 8, certain operations may be omitted, certain operations may be performed concurrently with other operations, and that some other operations may only be briefly described herein.

At operation 802, the process 800 may be started. The polyglot bot process 800 can be automated via a task scheduler 801, or started directly by user as desired via an user interface provided by a bot agent 304 via web browser in an user device. The same user interface may allow the user to cancel/stop/abort 818 a scheduled/started polyglot bot process 800. The actual termination of a running polyglot bot process 800 may happen after a processing delay that depends on the type of running instructions or the associated assignment. In a scenario when the user starts the bot process 800 via a bot agent, such as during testing, the associated assignment can be included in a request when the bot process 800 is started.

At operation 806, the polyglot service 206 may determine whether the user has instructed or given an assignment to the polyglot service 206 or just given a key to the assignment previously saved in the repository 810 (e.g., a data store). If the user has not provided an assignment to the polyglot service 206, the process 800 may proceed to operation 808 passing the key. If the user has provided an assignment to the polyglot service 206, then the process 800 may proceed to operation 820.

At operation 808, the polyglot service 206 may fetch an assignment from the repository 810 with the given key. The fetched assignment may be authored by the user via a user interface provided by a bot agent.

At operation 812, the polyglot service 206 may determine whether the assignment needs to be split. By being split, a larger assignment may be portioned into smaller assignments which may be more effectively executed in parallel rather than as a single larger assignment, where the larger assignment includes the smaller assignments, in series. Also, even though not shown in the flow chart, a same split may be applied to an assignment coming with a request, usually from a user via a bot agent, for example during testing. If yes, then the process 800 may proceed to operation 814. If no, the process 800 may proceed to operation 820.

At operation 814, the polyglot service 206 may split the work of the assignment to create child-tasks (e.g., smaller assignments). The child-tasks may be associated with the smaller assignments noted above. The child tasks may be stored in a task repository 816 (e.g., a data store). From the task repository 816, the child-tasks may be subsequently fetched and executed by a task scheduler and executor.

At operation 820, the polyglot service 206 may subscribe to messaging. By subscribing to messaging, the polyglot service 206 may be open to receiving instructions in the form of messages while the polyglot service 206 is performing the process 800 after start 802. The message may be, for example, an abort message 818 sent from the user 205 by a bot agent 304.

At operation 824, the polyglot service 206 may pass the polyglot code to a polyglot bot engine 308 for execution. The polyglot bot engine 308 may execute polyglot code (e.g., perform a polyglot process) in an automated manner, as the polyglot code may be in a language native to the polyglot bot engine 308. The polyglot bot engine 308 may also provide feedback to the polyglot service 206 as to whether the polyglot bot engine 308 has completed its assignments or has aborted its assignments.

At operation 828, the polyglot service 206 may update its status. The status may reflect the status of the polyglot bot engine 308 that was instructed to execute in operation 824. The status update may also be stored within the task repository 816.

At operation 830, the polyglot service 206 may determine whether the assignment performed by the polyglot bot engine 308 is a child task. If yes, then the process 800 may proceed to operation 832. If no, then the process 800 may proceed to operation 834.

At operation 832, the polyglot service may update the status of the child task performed by the polyglot bot engine 308 in the task repository 816. As the child task may be one part of a larger assignment, the update of the child task status in the task repository 816 may move the larger assignment closer to completion.

At operation 834, the process 800 may end.

Figure 9:
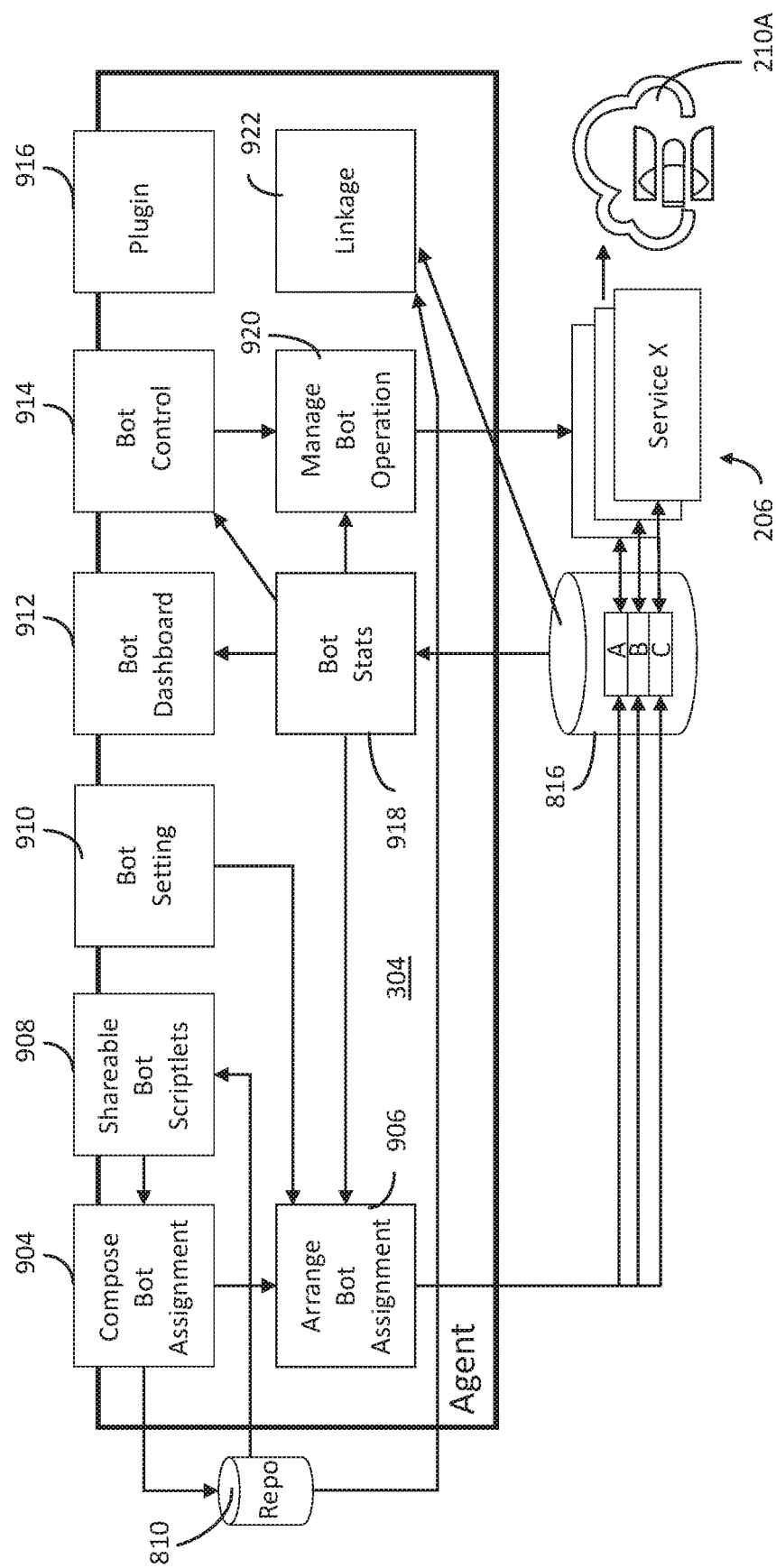
FIG. 9 is a schematic diagram of a bot agent, in accordance with some embodiments

FIG. 9 is a schematic diagram of a bot agent 304, in accordance with some embodiments. The bot agent may include various modules, such as a compose bot assignment module 904, an arrange bot assignment module 906, a sharable bot scriptlets module 908, a bot setting module 910, a bot dashboard module 912, a bot control module 914, a plugin module 916, a bot stats (e.g., statistics) module 918, a manage bot operation module 920, and a linkage module 922. The bot agent 304 may also interact with an assignment repository 810, a task repository 816, various polyglot services 206, and a remote data service (e.g., a data service search engine 210A).

The sharable bot scriptlets module 908 may provide scriptlets to the compose bot assignment module 904. The compose bot assignment module 904 may store various bot assignments in the assignment repository 810. The assignment repository 810 may also provide various scriptlets that make up the scriptlets of the sharable bot scriptlets module 908. The compose bot assignment module 904 may provide information for the arrangement of bot assignments for the arrange bot assignment module 906. The arrange bot assignment module 906 may arrange bot assignments in the task repository 816. The bot setting module 910 may also provide bot setting information to the arrange bot assignment module 906. The bot stats module 918 may receive information from the task repository 816 concerning bot statistics and provide the bot statistics to the bot dashboard module 912, the bot control module 914 and the manage bot operation module 920. The bot control module 914 may provide information for bot control to the manage bot operation module 920. The manage bot operation module 920 may provide bot management information to various polyglot services 206 (e.g., polyglot services where various polyglot bot processes are running). The various polyglot services 206 may interact and utilize a remote data service with search capability 210A. An example may include Elasticsearch, which is a distributed, multitenant-capable full-text search engine with a hypertext transfer protocol (HTTP) web interface and schema-free JavaScript object notation (JSON) documents. Elasticsearch is a well-known and conventional remote data service and thus will not be discussed in detail herein. The linkage module 922 may receive information from the assignment repository 810, task repository 816, and/or the remote data service with search capability 210A to provide data to any plugin module for visualization and cause discovery.

Figure 10:
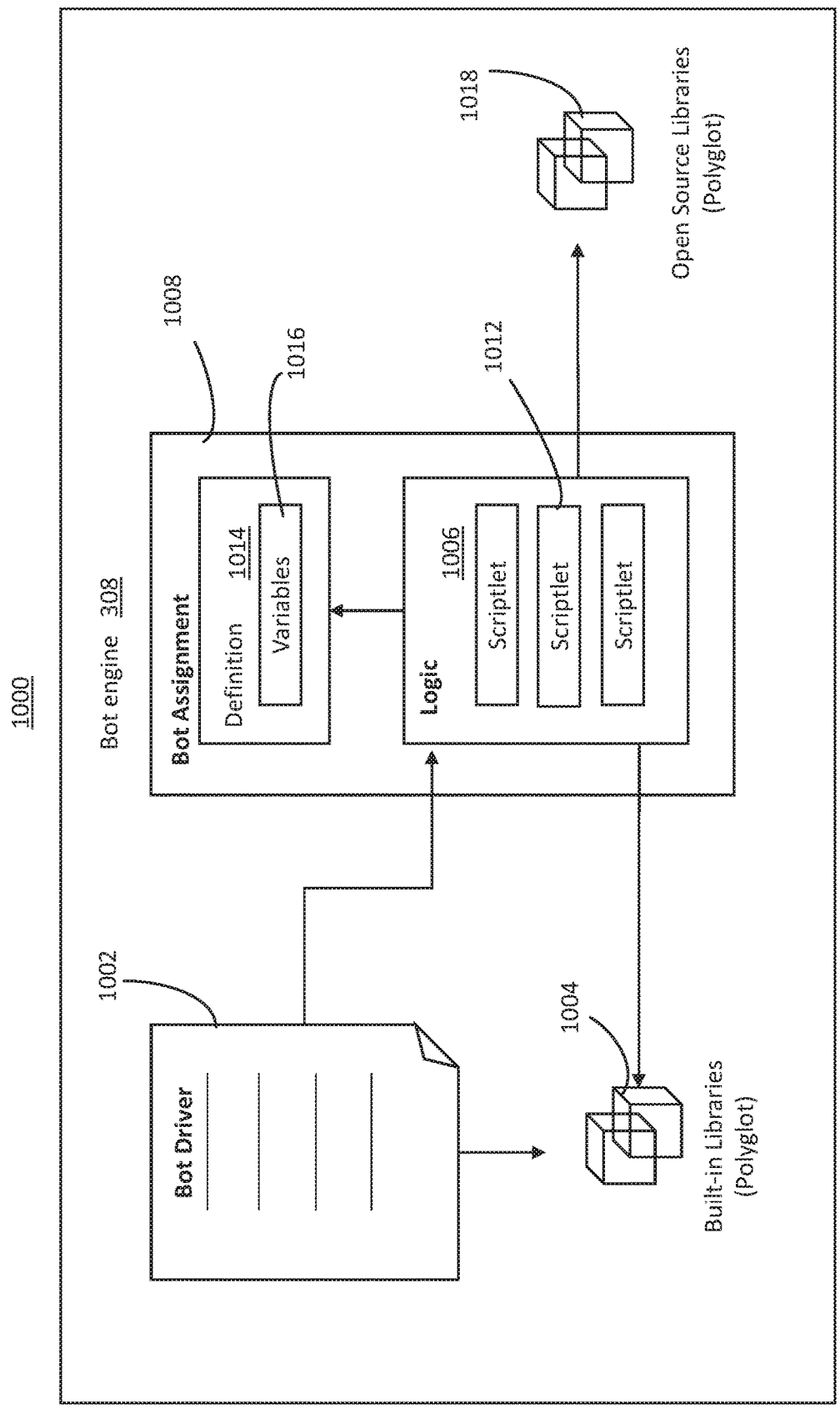
FIG. 10 is a block diagram of polyglot bot engine, in accordance with some embodiments.

FIG. 10 is a block diagram 1000 of a polyglot bot engine 308, in accordance with some embodiments. The polyglot bot engine 308 may be part of a polyglot service 206 as discussed above. A polyglot bot driver 1002 may interact with various built in libraries 1004, which may include scripts or scriptlets for performance of polyglot processes. Also, the polyglot bot driver 1002 may interact with logic 1006 inside a polyglot bot assignment 1008. The logic 1006 may include various scriptlets 1012 which may be executed to implement the logic 1006. The polyglot bot assignment 1008 may also include various definitions 1014 including variables 1016 which may be utilized or manipulated by the logic 1006. The logic 1006 may utilize the built in libraries 1004 and/or external libraries 1018, such as open source packages in JavaScript, Python, or R.

Figure 11:
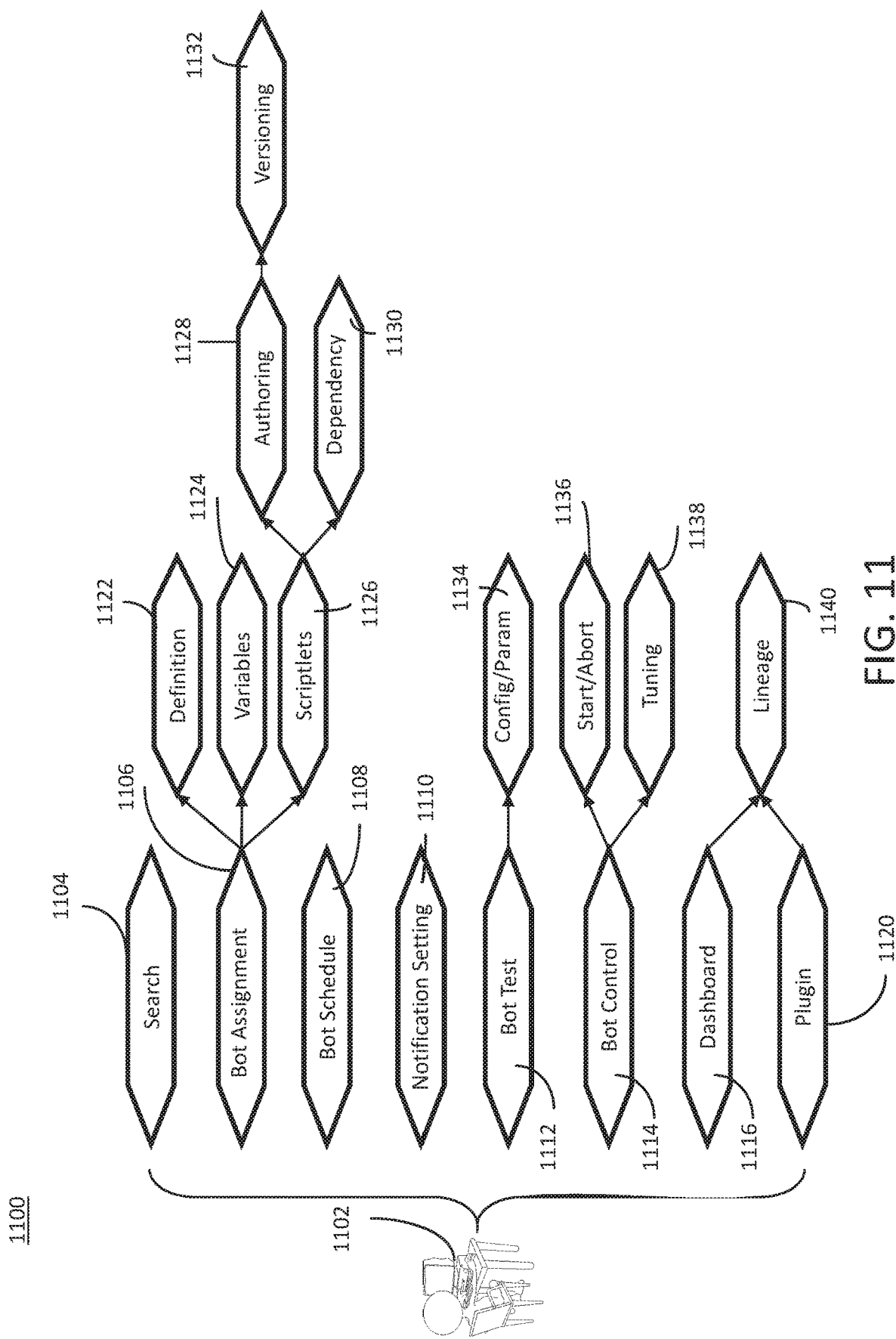
FIG. 11 is a schematic block diagram of a bot agent user interface, in accordance with some embodiments.

FIG. 11 is a block diagram 1100 of a bot agent user interface, in accordance with some embodiments. The block diagram illustrates various options that a user 1102 may select from when interacting with a bot agent. The user 1102 may select from options to: search 1104, author bot assignment(s) 1106, define a bot schedule 1108, set notification settings 1110, test a bot assignment (e.g., bot test 1112), control a bot (e.g., bot control 1114), view a bot dashboard 1116, or interact with a bot plugin 1120.

As part of a bot assignment 1106, the user 1102 may provide definitions 1122, variables 1124, or scriptlets 1126 for the bot assignment 1106. For scriptlets 1126, an authoring editor designation 1128 will be provided, and a scriptlet dependency graph 1130 may be displayed to visualize the scriptlet composition and flow. For the authoring editor designation 1128, versioning information 1132 can be provided.

Based on a selection of bot test 1112, the user 1102 may provide information on configurations or parameters 1134 for the bot test 1112. For the bot control 1114, the user 1102 may take action to start or abort a bot's operation or tune a bot assignment's outcome by modifying its variables 1124. Using either a bot dashboard 1116 or a bot plugin 1120, the user may comprehend the linkage between the outcome of the bot assignment and its cause.

Figure 12:
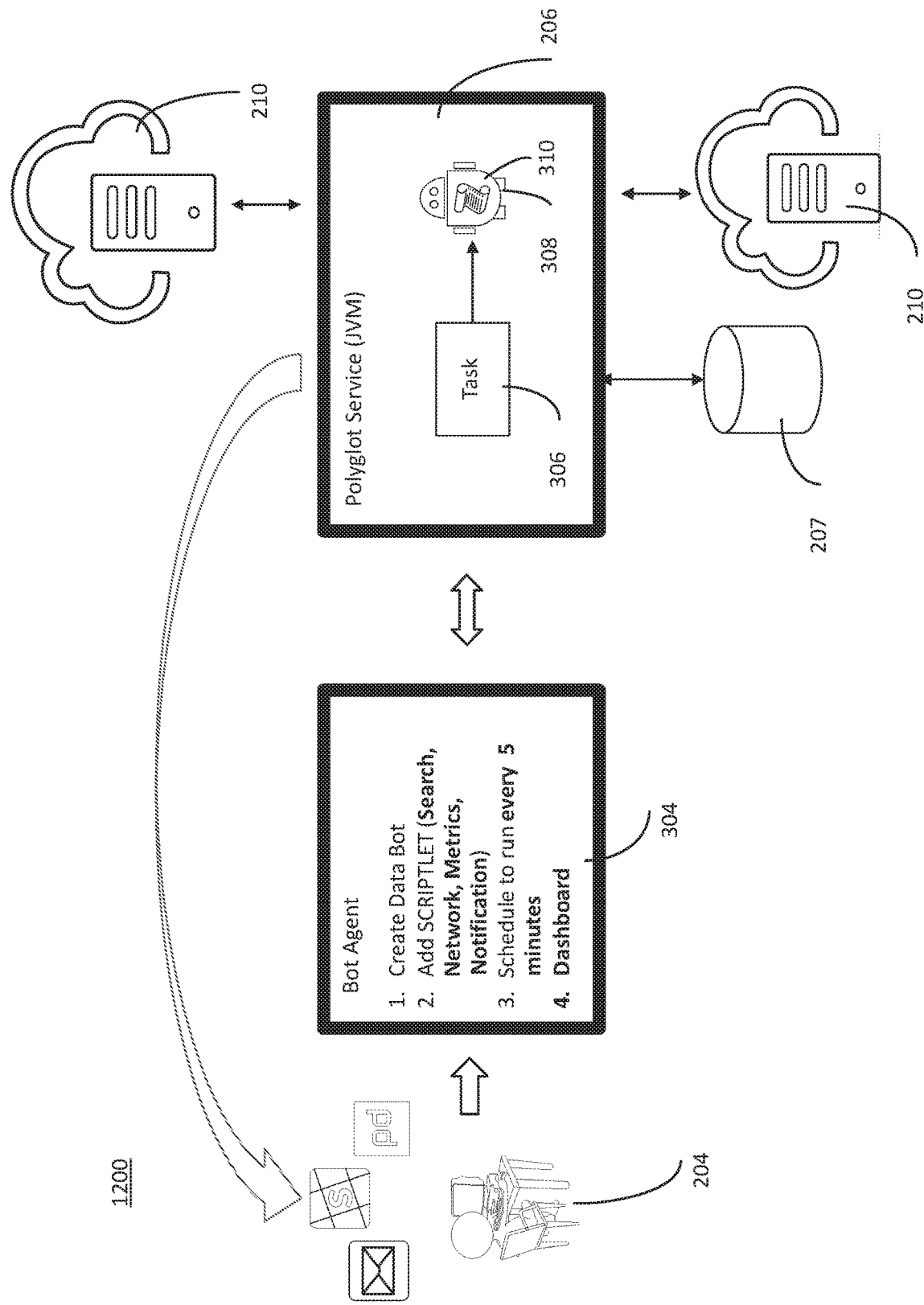
FIG. 12 is a block diagram of a watch and alert use case, in accordance with some embodiments.

FIG. 12 is a block diagram 1200 of a watch and alert use case, in accordance with some embodiments. The watch and alert use case may, for example, follow credit card accounts that satisfy certain conditions. A notification is triggered if any of the credit card accounts show up in certain transactions. Also, the connections between the credit card accounts to other related information may be visualized to the user device 204.

The user device 204 may access the polyglot service via a bot agent 304 (e.g., an agent for a polyglot process) on a user device. Within the context of the bot agent 304, the user utilizing the user device 204 may create a data bot, add a scriptlet (e.g., for search, networks, metrics, and notifications), and schedule to run the scriptlet periodically (e.g., every 5 minutes). For example, the scriptlet may include an instruction including a threshold (e.g., defining metrics) for a result that includes an alert in response to a value of a dataset exceeding the threshold. Also, the user utilizing the user device 204 may set up a dashboard to view results. The bot agent 304 communicates with the polyglot service 206 to perform various tasks 306 by various polyglot bot engines 308 and/or polyglot frameworks 310. The polyglot service 206 may host a Java virtual machine. The polyglot service 206 also interact with various data stores 207 and remote data services 210 in performance of its tasks, as instructed initially by the user device 204. As discussed above, the polyglot service may adapt the instructions from the user's original language into native languages for execution of the watch and alert use case.

Figure 13:
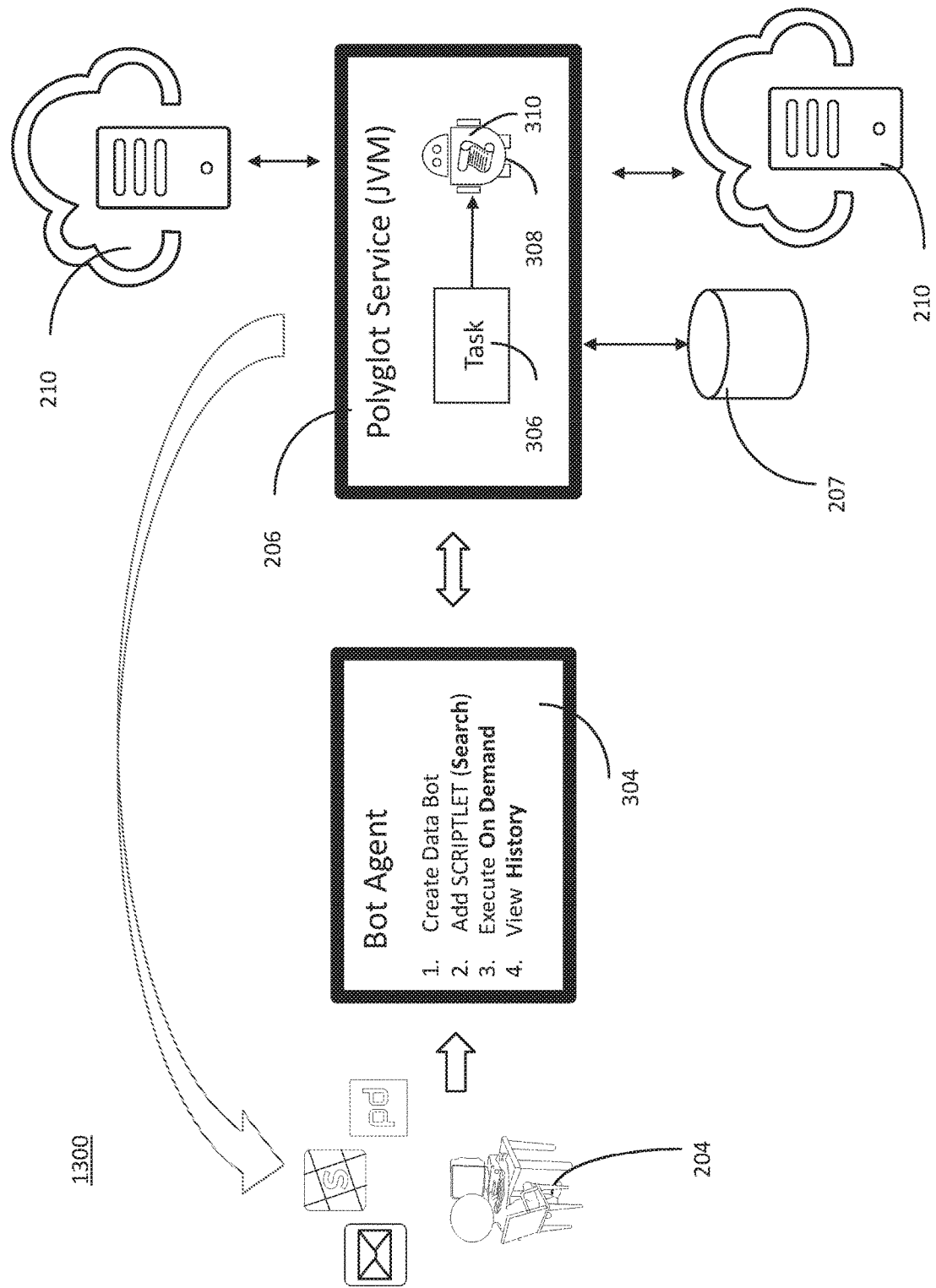
FIG. 13 is a block diagram of a feedback to product use case, in accordance with some embodiments.

FIG. 13 is a block diagram 1300 of a feedback to production use case, in accordance with some embodiments. The feedback to production use case may describe a use case where, for example, a user using a user device 204 may receive fraudulent order numbers periodically (e.g., once a week). The user may want to find related information and add the related information to a production system. The data that is entered may need to be audited.

The user device 204 may access the polyglot service via a bot agent 304 (e.g., an agent for a polyglot process) on a user device. Within the context of the bot agent 304, the user device 204 may create a data bot, add a scriptlet (e.g., for search of a data store or other services), and schedule to run the scriptlet on demand. Also, the user device 204 may set up a dashboard to view results (e.g., view history). The bot agent 304 communicates with the polyglot service 206 to perform various tasks 306 by various polyglot bot engines 308 and/or polyglot frameworks 310. The polyglot service 206 may host a Java virtual machine. The polyglot service 206 also interact with various data stores 207 and remote data services 210 in performance of its tasks, as instructed initially by the user device 204. As discussed above, the polyglot service may adapt the instructions from the user's original language into native languages for execution of the feedback to production use case.

Figure 14:
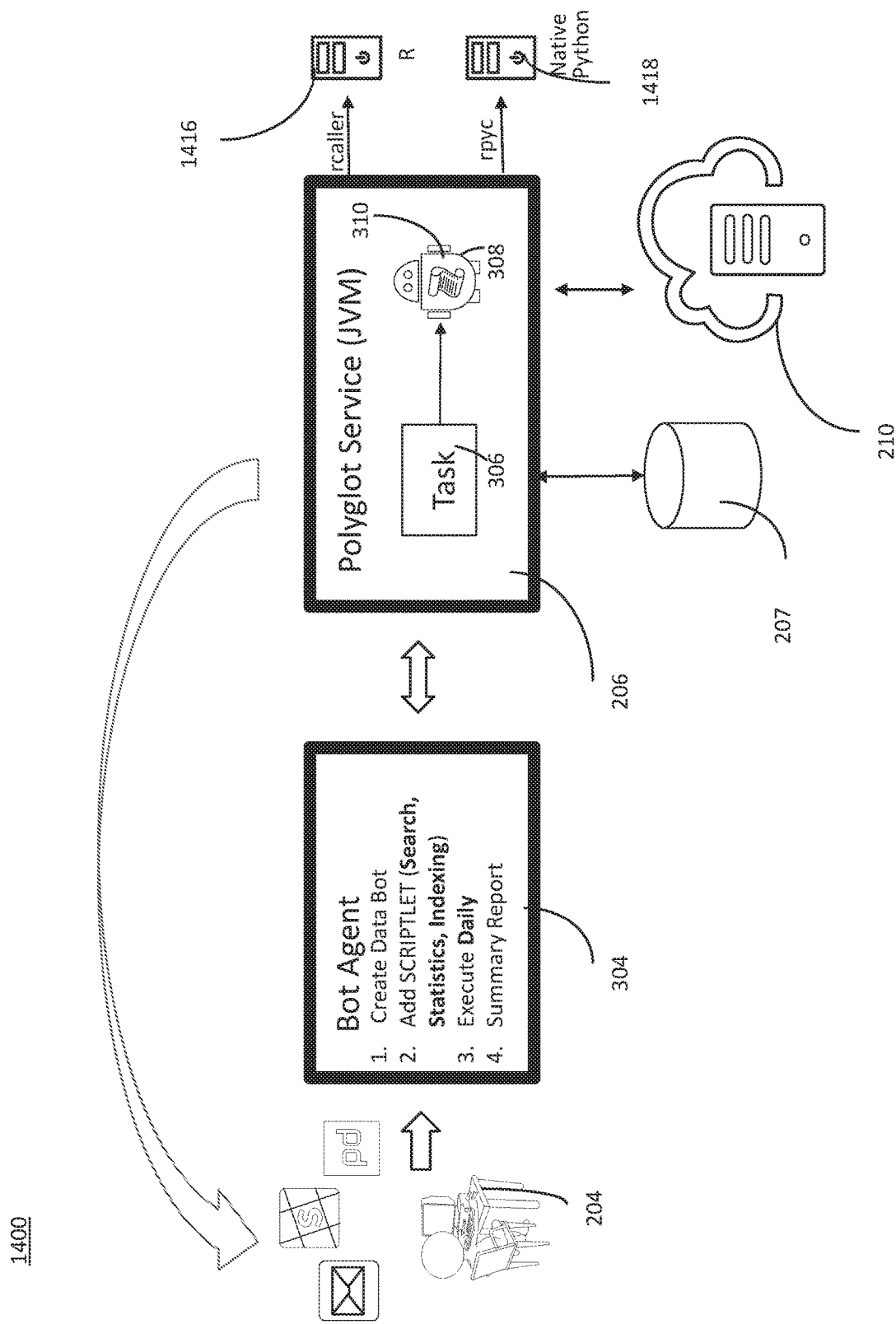
FIG. 14 is a block diagram of a statistical analysis use case, in accordance with some embodiments.

FIG. 14 is a block diagram 1400 of a statistical analysis use case, in accordance with some embodiments. The statistical analysis use case may be for analysing model performance using statistical packages in particular languages (e.g., Python or R), and indexing the results to a remote data service (e.g., Elasticsearch). The statistical analysis may also include providing a summary report for each run. The summary report may report on data volume, total time taken, and the like.

The user using a user device 204 may access the polyglot service via a bot agent 304 (e.g., an agent for a polyglot process) on a user device. Within the context of the bot agent 304, the user device 204 may create a data bot, add a scriptlet (e.g., for search, statistics, and indexing), and schedule to run the scriptlet periodically (e.g., daily). Also, the user device 204 may set up a dashboard to view results (e.g., view summary report). The bot agent 304 communicates with the polyglot service 206 to perform various tasks 306 by various polyglot bot engines 308 and/or polyglot frameworks 310. The polyglot service 206 may host a Java virtual machine. The polyglot service 206 also interacts with various data stores 207, remote data services 210, and various libraries in specific languages (e.g., an R library 1416 and a Python library 1418) in performance of its tasks, as instructed by the user device 204. As discussed above, the polyglot service may adapt the instructions from the user's original language into native languages for execution of the statistical analysis use case.

Figure 15:
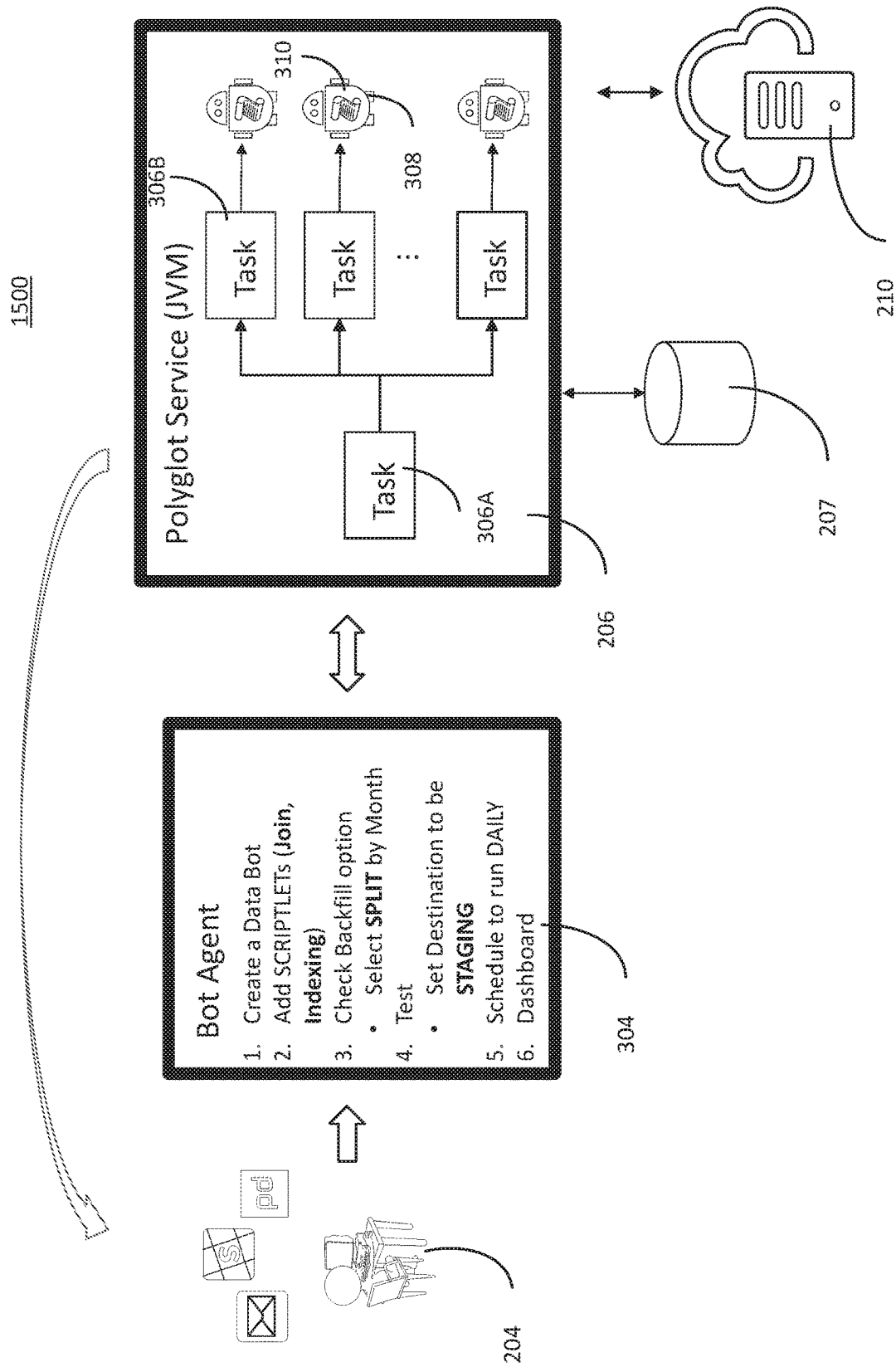
FIG. 15 is a block diagram of a data preparation use case, in accordance with some embodiments.

FIG. 15 is a block diagram 1500 of a data preparation use case, in accordance with some embodiments. The data preparation use case may be for a particular analysis platform, such as Elasticsearch, which is discussed further above. The data preparation use case may include backfilling data from a period of time (e.g., six months), and then running the analysis platform daily moving forward. Also, the data preparation may include an initial staging and notifications with statistics of each run, after each run is complete.

The user using a user device 204 may access the polyglot service via a bot agent 304 (e.g., an agent for a polyglot process) on a user device. Within the context of the bot agent 304, the user device 204 may create a data bot, add a scriptlet (e.g., for joining data and indexing the data), checking a backfill option (e.g., by selecting split by month), setting up a test (e.g., setting a destination for staging), and schedule to run the scriptlet periodically (e.g., daily). Also, the user device 204 may set up a dashboard to view results. The bot agent 304 communicates with the polyglot service 206 to perform various tasks 306A, 306B by various polyglot bot engines 308 and/or polyglot frameworks 310. As discussed above, a task may also be referred to as an assignment. More specifically, a main task 306A may be split into multiple smaller tasks 306B for performance using respective polyglot bot engines 308 and/or polyglot frameworks 310. The polyglot service 206 may host a Java virtual machine. The polyglot service 206 also interact with various data stores 207 and remote data services 210, in performance of its tasks, as instructed initially by the user device 204. As discussed above, the polyglot service may adapt the instructions from the user's original language into native languages for execution of the data preparation use case.

Figure 16:
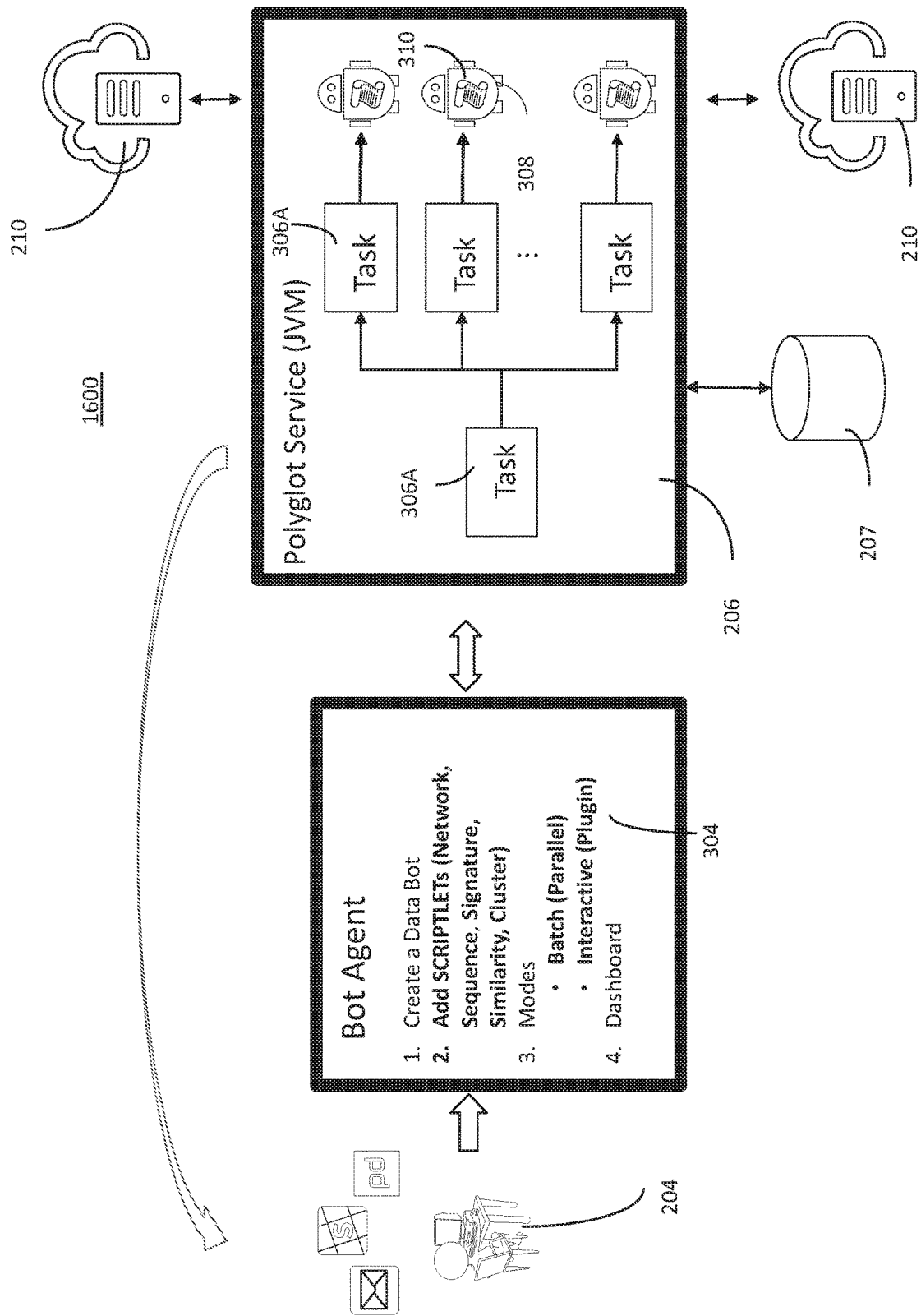
FIG. 16 is a block diagram of a cluster identification use case, in accordance with some embodiments.

FIG. 16 is a block diagram 1600 of a cluster identification use case, in accordance with some embodiments. The cluster identification use case may be for identifying clusters with common behaviour patterns. For example, the cluster identification use case may include developing machine learning capabilities to identify clusters with common behaviour patterns in a vast amount of transactions (e.g., data). The cluster identification use case may include both high scale batch processing as well as interactive case reviews that share the same code. The cluster identification sue case may also include leverage of packages in a particular language (e.g., Python packages) for clustering analysis.

The user using a user device 204 may access the polyglot service via a bot agent 304 (e.g., an agent for a polyglot process) on a user device. Within the context of the bot agent 304, the user device 204 may create a data bot, add a scriptlet (e.g., for defining a network, a sequence, a signature, similarity features, and a cluster), and set up a mode option (e.g., a parallel batch and interactive plugin). Also, the user device 204 may set up a dashboard to view results. The bot agent 304 communicates with the polyglot service 206 to perform various tasks 306A, 306B by various polyglot bot engines 308 and/or polyglot frameworks 310. More specifically, a main task 306A may be split into multiple smaller tasks 306B for performance using respective polyglot bot engines 308 and/or polyglot frameworks 310. As discussed above, a task may also be referred to as an assignment. The polyglot service 206 may host a Java virtual machine. The polyglot service 206 also interact with various data stores 207 and remote data services 210, in performance of its tasks, as instructed initially by the user device 204. As discussed above, the polyglot service may adapt the instructions from the user's original language into native languages for execution of the cluster identification use case.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according to embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A system, comprising:
   at least one processor operatively coupled with a data store, the at least one processor configured to:
   adapt at least one first instruction expressed in a first language and at least one second instruction expressed in the first language into a code, wherein the code comprises:
   the at least one first instruction expressed in the first language, and
   the at least one second instruction expressed in a second language, wherein the at least one processor is configured to adapt the at least one first instruction and the at least one second instruction in a single execution;
   produce a first result expressed in the first language based on executing the at least one first instruction from the code to process using a dataset in the data store, wherein the at least one processor is configured to produce the first result expressed in the first language in the single execution;

produce a second result expressed in the second language based on executing the at least one second instruction from the code to process the dataset, wherein the at least one processor is configured to produce the second result expressed in the second language in the single execution; and adapt the second result from being expressed in the second language into being expressed in the first language, wherein the at least one processor is configured to adapt the second result in the single execution.

2. The system of claim 1, wherein the at least one processor is configured to adapt the at least one first instruction, the at least one second instruction, and the second result using a script.

3. The system of claim 1, wherein the at least one first instruction comprises a threshold and the first result is an alert in response to a value of the dataset exceeding the threshold.

4. The system of claim 1, wherein the at least one processor is configured to:
wrap execution information for the single execution as expressed in the first language into being expressed in the second language; and
unwrap the execution information for the single execution as expressed in the second language into being expressed in the first language.

5. The system of claim 1, wherein the first language is Java and the second language is R.

6. The system of claim 1, wherein the at least one processor is configured to:
adapt the at least one second instruction expressed in the second language into the code comprising at least one third instruction expressed in a third language, wherein the at least one processor is configured to adapt the at least one second instruction expressed in the second language in the single execution;
produce the second result expressed in the third language based on executing the at least one third instruction from the code to process the dataset, wherein the at least one processor is configured to produce the second result expressed in the third language in the single execution; and
adapt the second result from being expressed in the third language into being expressed in the second language, where the at least one processor is configured to adapt the second result from being expressed in the third language in the single execution.

7. The system of claim 1, wherein the at least one second instruction comprises a remote call in the second language.

8. The system of claim 1, wherein the at least one second instruction is a library native to the second language.

9. A method performed by at least one processor, comprising:
adapting at least one first instruction expressed in a first language and at least one second instruction expressed in the first language into a code comprising the at least one first instruction expressed in the first language and the at least one second instruction expressed in a second language, wherein the adapting the at least one first instruction and the at least one second instruction is performed in a single execution;

producing a first result expressed in the first language based on executing the at least one first instruction from the code to process a dataset in a data store, wherein the producing the first result expressed in the first language is performed in the single execution;

producing a second result expressed in the second language based on executing the at least one second instruction from the code to process the dataset, wherein the producing the second result expressed in the second language is performed in the single execution; and adapting the second result from being expressed in the second language into being expressed in the first language, where adapting the second result is performed in the single execution.

10. The method of claim 9, further comprising:
wrapping execution information for the single execution as expressed in the first language into being expressed in the second language; and
unwrapping the execution information for the single execution as expressed in the second language into being expressed in the first language.

11. The method of claim 9, further comprising:
adapting the at least one second instruction in the second language into the code comprising at least one third instruction expressed in a third language, wherein the adapting the at least one second instruction expressed in the second language is performed in the single execution;
producing the second result expressed in the third language based on executing the at least one second instruction from the code to process the dataset, wherein the producing the second result expressed in the third language is performed in the single execution;
adapting the second result from being expressed in the third language into being expressed in the second language, where the adapting the second result from being expressed in the third language is performed in the single execution.

12. The method of claim 9, wherein the first language is Java and the second language is R.

13. The method of claim 9, wherein the at least one first instruction comprises a threshold and the first result is an alert in response to a value of the dataset exceeding the threshold.

14. The method of claim 9, wherein the at least one second instruction comprises a remote call in the second language.

15. The method of claim 9, wherein the at least one second instruction is a library native to the second language.

16. A non-transitory computer readable medium having instructions stored thereon, wherein the instructions, when executed by a processor, cause a hardware device to perform operations comprising:
adapting at least one first instruction expressed in a first language and at least one second instruction expressed in the first language into a code comprising the at least one first instruction expressed in the first language and the at least one second instruction expressed in a second language, wherein the adapting the at least one first instruction and the at least one second instruction is performed in a single execution;
producing a first result expressed in the first language based on executing the code using a dataset in a data store, wherein the producing the first result expressed in the first language is performed in the single execution;

producing a second result expressed in the second language based on executing the code using the dataset, wherein the producing the second result expressed in the second language is performed in the single execution; and adapting the second result from being expressed in the second language into being expressed in the first language, where adapting the second result is performed in the single execution.

17. The non-transitory computer readable medium of claim 16, wherein the first language is Java and the second language is R.

18. The non-transitory computer readable medium of claim 16, wherein the at least one first instruction comprises a threshold and the first result is an alert in response to a value of the dataset exceeding the threshold.

19. The non-transitory computer readable medium of claim 16, wherein the at least one second instruction comprises a remote call in the second language.

20. The non-transitory computer readable medium of claim 16, wherein the at least one second instruction is a library native to the second language.

* * * * *